US010338241B2

(12) United States Patent
Tayart De Borms

(10) Patent No.: US 10,338,241 B2
(45) Date of Patent: Jul. 2, 2019

(54) SEISMIC SWEEP USING ODD ORDER HARMONICS

(71) Applicant: CGG SERVICES SA, Massy (FR)

(72) Inventor: Brice Tayart De Borms, Paris (FR)

(73) Assignee: CGG SERVICES SAS, Massy (FR)

(*) Notice: Subject to any disclaimer, the term of this patent is extended or adjusted under 35 U.S.C. 154(b) by 750 days.

(21) Appl. No.: 14/945,895

(22) Filed: Nov. 19, 2015

(65) Prior Publication Data

US 2016/0146955 A1 May 26, 2016

Related U.S. Application Data

(60) Provisional application No. 62/082,390, filed on Nov. 20, 2014.

(51) Int. Cl.
  *G01V 1/04* (2006.01)
  *G01V 1/00* (2006.01)

(52) U.S. Cl.
  CPC .............. *G01V 1/04* (2013.01); *G01V 1/005* (2013.01)

(58) Field of Classification Search
  CPC .................................. G01V 1/04; G01V 1/005
  See application file for complete search history.

(56) References Cited

U.S. PATENT DOCUMENTS

| 8,274,862 | B2 | 9/2012 | Sallas |
| 2006/0018192 | A1* | 1/2006 | Jeffryes ................. G01V 1/005 367/41 |
| 2011/0085416 | A1 | 4/2011 | Sallas |
| 2014/0169128 | A1 | 6/2014 | Orban et al. |
| 2016/0146955 | A1* | 5/2016 | Tayart De Borms .... G01V 1/04 367/190 |

FOREIGN PATENT DOCUMENTS

| EP | 0 257 231 A2 | 3/1988 | |
| EP | 3023813 A3 * | 6/2016 | ............... G01V 1/04 |
| GB | 2416033 A | 1/2006 | |

OTHER PUBLICATIONS

European Search Report in corresponding European Application No. 15 30 6842 dated May 3, 2016.
Z. Wei, "Fundamental discussions on seismic vibrators"; Geophysics, Society of Exploration Geophysicists, US; vol. 75, No. 6; XP001562810; Nov. 1, 2010; pp. W13-W25.
Office Action in European Application No. 15 306 842.4 dated Jan. 21, 2019. (All references not cited herewith have been previously made of record.).

* cited by examiner

*Primary Examiner* — Daniel Pihulic
(74) *Attorney, Agent, or Firm* — Patent Portfolio Builders PLLC

(57) ABSTRACT

Sweep signals for vibrators used to generate seismic signals for seismic surveys are described. By selecting a certain amount of one or more odd order harmonic components to be included in the sweep signal, the amplitude of the seismic signal generated by the vibrator can be increased.

18 Claims, 10 Drawing Sheets

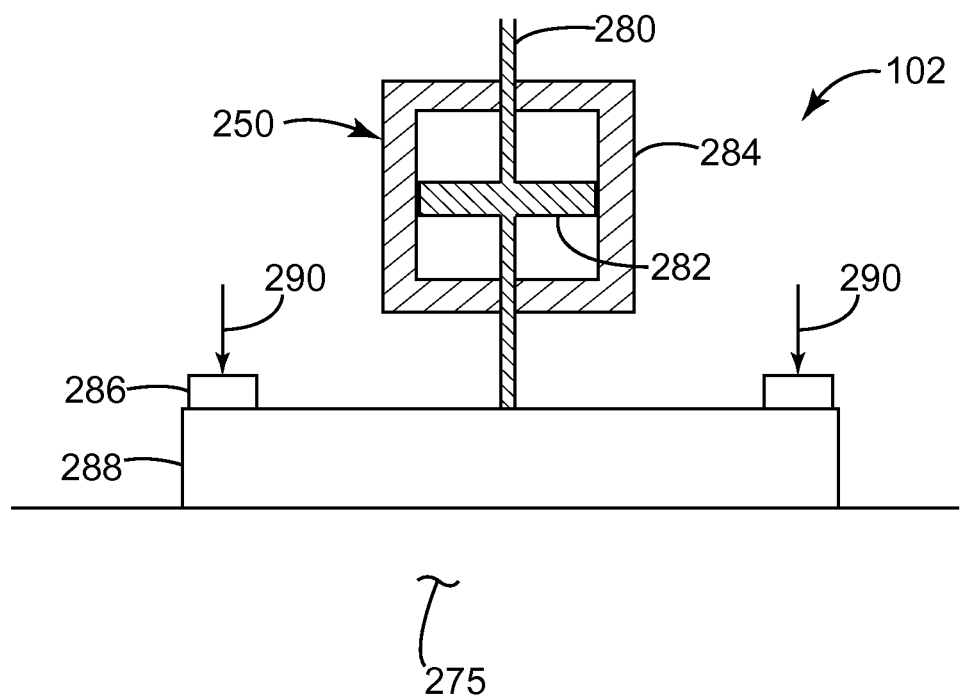

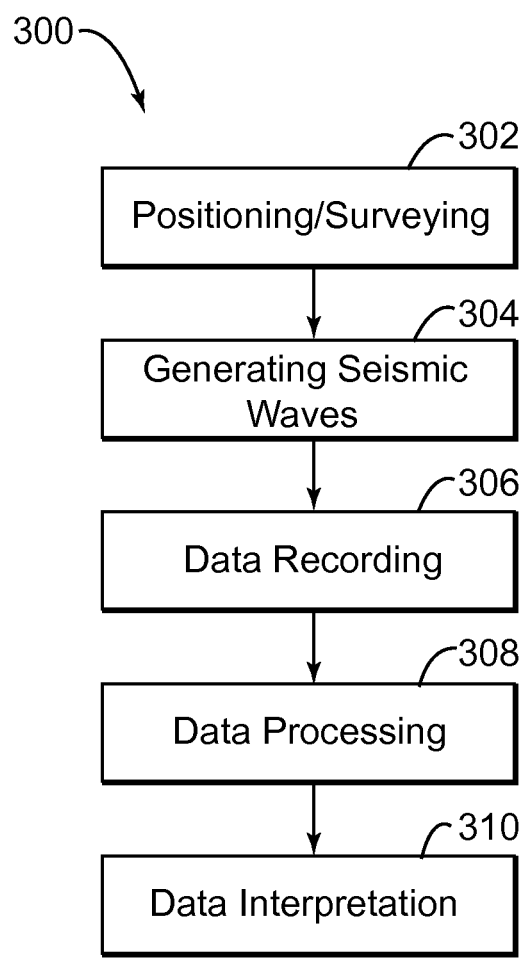

SEISMIC SWEEP USING ODD ORDER HARMONICS

CROSS-REFERENCE TO RELATED APPLICATIONS

The present application is related to and claims the benefit of priority of U.S. Provisional Application Ser. No. 62/082,390, filed on Nov. 20, 2014, having the title "Seismic Sweep Using Odd Order Harmonics," and being authored by Brice Tayart De Borms, the entire content of which is incorporated herein by reference.

TECHNICAL FIELD

The present embodiments relate generally to land seismic exploration systems and methods, and more specifically to systems and methods for improving the sweep amplitude of vibrators used with land seismic systems.

BACKGROUND

Seismic waves generated artificially have been used for more than 50 years to perform imaging of geological layers. During seismic exploration operations, vibrator equipment (also known as a "source") generates a seismic signal that propagates in the form of a wave that is reflected at interfaces of geological layers. These reflected waves are received by seismic sensors, such as hydrophones, geophones or accelerometers, which convert the displacement or overpressure of the ground resulting from the propagation of the waves into an analog or digital, electrical or optical signal which is recorded. Analysis of the arrival times and amplitudes of these waves make it possible to construct a representation of the geological layers on which the waves are reflected.

FIG. 1 depicts schematically a system 100 for transmitting and receiving seismic waves intended for seismic exploration in a land environment. The system 100 comprises a source 102 consisting of a vibrator operable to generate a seismic signal, a set of receivers 104 (e.g., geophones) for receiving a seismic signal and converting it into an electrical signal and a seismic data acquisition recorder system (recorder system) 106 for recording the electrical signals generated by the receivers 104. The source 102, the receivers 104 and the recorder system 106 are positioned on the surface of the ground 108. FIG. 1 depicts source 102 as a single vibrator but it should be understood that the source can be composed of several vibrators, as known to those of skill in the art. System 100 further includes vehicle 122a, for housing the source 102, and vehicle 122b for housing recorder system 106, as well as antennas 124 for communications between vehicles 122a,b (and source 102) and receivers 104. The receivers 104 are interconnected by cables 126 and connected to recorder system 106. Antennas 124 on receivers 104 can communicate data from receivers 104 to recorder system 106, as can cables 126. Furthermore, in operation, vehicle 122a is generally not static, but generates transmitted waves in different locations for the geographical area of interest (GAI).

In operation, source 102 is operated so as to generate a seismic signal. This signal propagates firstly on the surface of the ground, in the form of surface waves 110, and secondly in the subsoil, in the form of transmitted body waves 112 that generate reflected and converted waves 114 when they reach an interface 115 between two geological layers. Each receiver 104 receives both a surface wave 110 and a reflected wave 114 and converts them into an electrical or optical signal, which signal thus includes a component associated with the reflected wave 114 and another component associated with the surface wave 110. Since system 100 intends to image the subsurface regions 116 and 118, including a hydrocarbon deposit 120, the component in the electrical signal associated with the surface wave 110 is usually undesirable and should be filtered out.

An example of a vibratory source (source) 102 is shown in FIG. 2. Source 102 can include base plate 288 and reaction mass 284, and actuator 250 that applies a force between base plate 288 and reaction mass 284. Actuator 250 can be hydraulic and can consist of rod 280 and piston 282 inside reaction mass 284, in which case the force is generated by injecting into one of the piston chamber a pressurized fluid, usually oil, while the same fluid is drawn from the other chamber. A four way valve can adjust the circulation of the pressurized fluid, and a control system (not shown) can set the position of the valve so that a desired force is applied to the ground by baseplate 288. A hydraulic pump driven by a motor (also not shown) can supply the pressurized fluid necessary for the operation of source 102, while hydraulic accumulators can be used to supply limited amounts of oil and limit the variations of flow rate through the pump. In another implementation, actuator 250 can be a plurality of electric linear motors. The electric current sent to the individual electric linear motors can be set by a control system, so that the force applied to the ground by baseplate 288 reaches a desirable level. In another implementation, the actuator 250 can be a piezoelectric actuator. The electric voltage applied to piezoelectric actuator 250 can be set by a control system, so that the force applied to ground 275 by baseplate 288 reaches a desirable level. Vibration isolation devices 286 can be provided on base plate 288 to transmit weight 290 of vehicle 122a to base plate 288. Base plate 288 is shown in FIG. 2 as contacting the ground 275. The force transmitted to ground 275 can be estimated by a "weighted sum estimate" method as equal to the mass of base plate 288 times its acceleration, plus the weight of reaction mass 284 times its acceleration. Accelerometers located on baseplate 288 and reaction mass 284 provide to the control system a feedback on the force applied to ground 275 by baseplate 288. The weight of vehicle 273 (shown in FIG. 1 as vehicle 122a) prevents base plate 288 from losing contact with ground 275. Those skilled in the art will appreciate that many other designs for vibratory sources 271 exist on the market, and that any of them can be used with the embodiments discussed herein.

Vibratory source 271 generates a long tone with a varying frequency, i.e., a frequency sweep. This desired signal is input into the control system, which then sets the parameters of actuator 250 applied to a moving part, e.g., a piston, which generates a corresponding seismic wave. More specifically, the control system adjusts some parameters of the actuator 250 (depending on, for example, the type of actuator being used: hydraulic, electric, etc.) so that the force exerted by the baseplate onto the ground matches a desired signal. Applying a variable force onto the ground results in seismic waves being radiated at the surface of the ground and into the subsurface. The design of the frequency sweep for a seismic system will now be discussed.

A frequency sweep is a sinusoid with a continuously variable frequency, and can be defined by its amplitude A(f) and its sweep rate Sr(f), the latter of which is defined as the derivative of the frequency relative to time df/dt. Provided the sweep is long enough (e.g., longer than 5 or 6 seconds), the amplitude spectrum of the sweep at frequency f is proportional to A(f) and to the square root of 1/Sr(f). Target-oriented sweep design (i.e., searching for a particular known type of hydrocarbon, in a particular known type of geological formation) involves defining A(f) and Sr(f) to obtain the desired signal-to-noise ratio (SNR) of the target reflection.

It has thus become common to use seismic vibrators (sources 271) in seismic prospecting with predetermined frequency sweeps. Typically, a number of vibrators 271 emit a long swept frequency signal in the seismic frequency range. The emitted signal 112 (after reflection and refraction within the earth) is received by detectors 104 spaced along a spread, and received signal 114 can then be cross-correlated with the emitted swept frequency signal 112. This operation yields a seismic record that is then processed into a representation of a cross-section of the earth, using techniques known to those of skill in the art.

The main factors that limit the amplitude of signal 112 that vibratory source 271 can send into ground 275 have been identified as the peak force, which is the maximum force vibrator 271 is capable of applying between baseplate 288 and its reaction mass 284 while remaining coupled to ground 275, and the mass stroke, which is the maximum allowable displacement of reaction mass 284 with respect to baseplate 288. While "pushing" onto ground 275 is usually not an issue, "pulling" baseplate 288 too hard, in excess of the hold-down weight 290, will result in baseplate 288 lifting from ground 275.

The mass stroke, which is the maximum allowable displacement of reaction mass 284 with respect to baseplate 288, is another limitation. As the reaction mass 284 moves freely, any force applied between baseplate 288 and reaction 284 mass will result in a movement of the reaction mass 284. The space in which reaction mass 284 moves is limited, so there is a maximum displacement that reaction mass 284 should not exceed.

In the case of hydraulic vibrators, the oil flow may also be a limitation. The average oil flow needed to operate vibrator 102 at a certain frequency and amplitude cannot exceed the rated flow of the pump in steady-state. The peak oil flow through the four-way valve can also be a limiting factor, as a high flow rate of oil can generate a pressure drop that reduces the force applied to reaction mass 284, and as a high flow rate may result in accelerated erosion and wear of the valve. How these factors affect the signal depends on the frequency. Specifically, the peak force will typically be the limiting factor at high frequencies, the mass stroke at low frequencies and, with a hydraulic vibrator 102, the average oil flow rate for mid-range frequencies.

There exist already methods to maximize the amplitude of the emitted signal depending on which of these factors is the limiting factor, and these methods depend on the characteristics of vibrator 271 and on the emitted frequency, e.g., as described in U.S. Pat. No. 8,274,862, to John Sallas. However, such systems do not typically describe a mechanism to actually increase useful source output without exceeding system limits.

While it is the case that the emitted seismic signal will always be constrained to some extent by characteristics of the vibrator, it would nonetheless be desirable to emit a higher amplitude signal for given vibrator characteristics. Accordingly, it would be desirable to provide methods, modes and systems for increasing the amplitude of an emitted seismic signal without, for example, requiring increases in any of required force, oil flow rate and/or mass displacement with respect to seismic vibrators. Likewise, it would be desirable to provide methods, modes and systems which reduce the required force, oil flow rate and/or mass displacement with respect to seismic vibrators, while preserving the amplitude of the emitted signal.

SUMMARY

It is therefore a general aspect of the embodiments to provide a system and method for improving the sweep amplitude of vibrators used with seismic exploration systems that will obviate or minimize problems of the type previously described.

According to a first aspect of the embodiments, a method for generating a seismic signal is provided including the steps of generating a vibrator control signal having both one or more odd order harmonic components and a fundamental component; and applying the vibrator control signal to a vibrator which generates a seismic signal based on the vibrator control signal, the seismic signal being transmitted into ground or water, wherein an amount of the one or more odd order harmonic components added to the vibrator control signal is determined based on one or more characteristics of the vibrator used to generate the seismic signal.

According to a second aspect of the embodiments, a system for generating a seismic signal includes a processor configured to generate a vibrator control signal having both one or more odd order harmonic components and a fundamental component; and a vibrator which uses the vibrator control signal to generate a seismic signal, the seismic signal being transmitted into ground or water, wherein an amount of the one or more odd order harmonic components added to the vibrator control signal is determined based on one or more characteristics of the vibrator used to generate the seismic signal.

According to a third aspect of the embodiments, a non-transitory, computer readable medium includes program instructions stored therein which, when executed by a specially-programmed computing system, performs the steps of: generating a vibrator control signal having both one or more odd order harmonic components and a fundamental component; and applying the vibrator control signal to a vibrator which generates a seismic signal based on the vibrator control signal, the seismic signal being transmitted into ground or water, wherein an amount of the one or more odd order harmonic components added to the vibrator control signal is determined based on one or more characteristics of the vibrator used to generate the seismic signal.

BRIEF DESCRIPTION OF THE DRAWINGS

The above and other aspects and features of the embodiments will become apparent and more readily appreciated from the following description of the embodiments with reference to the following figures, wherein like reference numerals refer to like parts throughout the various figures unless otherwise specified, and wherein:

FIG. 2 illustrates a schematic block diagram of a vibratory source;

FIG. 3 illustrates a flow chart of general method for seismic exploration;

DETAILED DESCRIPTION

Figure 1:
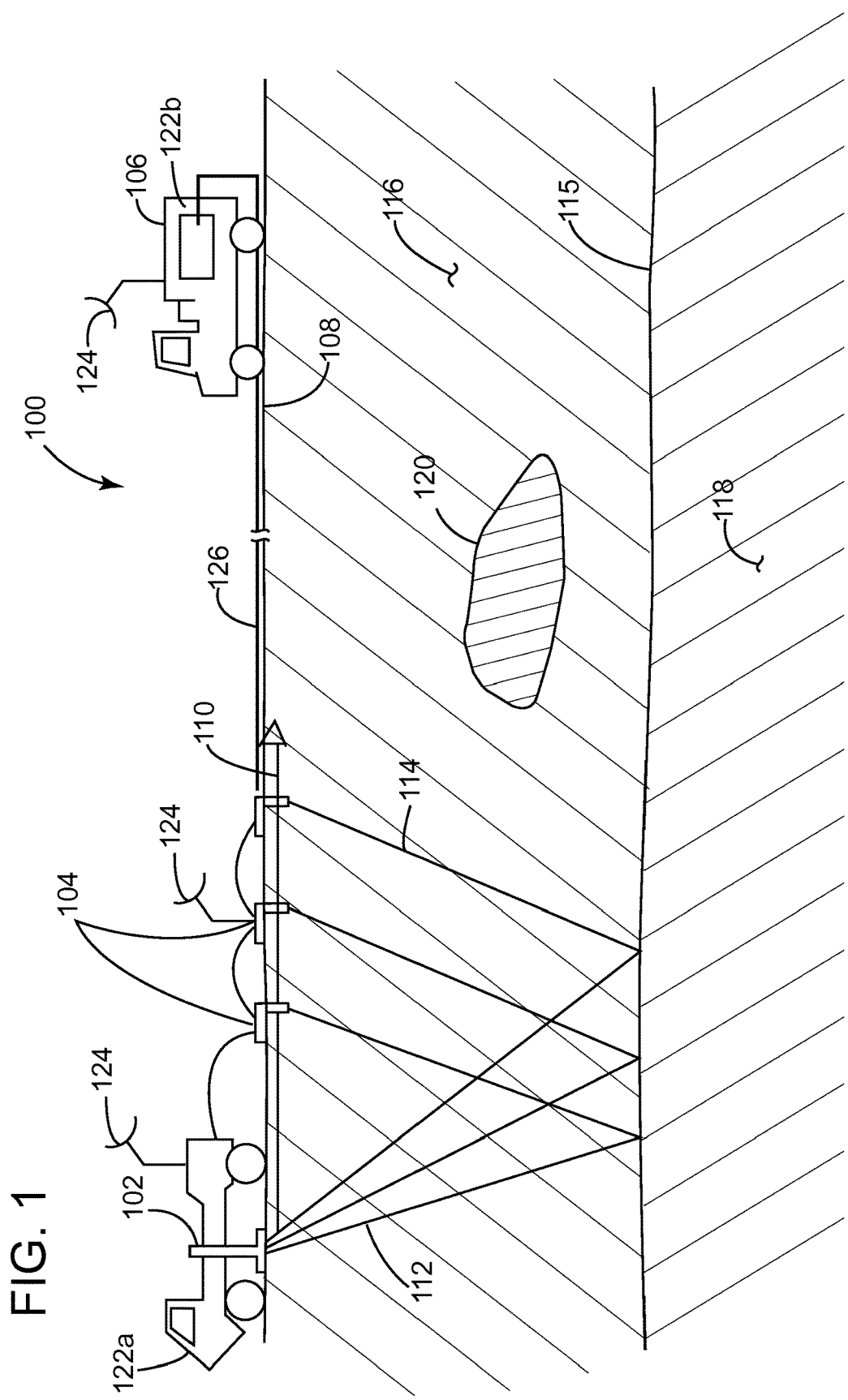
FIG. 1 depicts a system for transmitting and receiving seismic waves intended for seismic exploration in a land environment.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be complete, and will convey the scope of the embodied concepts to those skilled in the art. It will be apparent to one skilled in the art, however, that at least some embodiments may be practiced without one or more of specific details described herein. In other instances, well-known components or methods are not described in details or are presented in simple block diagram format in order to avoid unnecessarily obscuring the embodiments. The scope of the embodiments is therefore defined by the appended claims. The following embodiments are discussed, for simplicity, with regard to the terminology and structure of a land seismic exploration system. However, the embodiments to be discussed next are not limited to these systems but may be applied to other seismic exploration systems that are affected by generating swept frequency signals by sources, for example marine vibratory sources.

Reference throughout the specification to "one embodiment" or "an embodiment" means that a particular feature, structure, or characteristic described in connection with an embodiment is included in at least one embodiment of the present embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

According to embodiments, the amplitude of seismic waves generated by a vibratory source can be increased by using a seismic sweep signal that is tailored to the vibratory source by using a selected amount of an odd order harmonic of a fundamental frequency of the seismic sweep signal. As will be discussed in detail below, the amount of the odd harmonic to include in the sweep signal can be based on characteristics of the vibrator such as, for example, the maximum vibrator force, maximum vibrator oil flow rate, hydraulic supply pressure, servovalve torquemotor current rating and/or the maximum vibrator mass displacement of the chosen vibrator. For an electric marine vibrator such characteristics could include, for example, stroke, velocity, acceleration, current, voltage and/or power.

Prior to discussing such sweep signal generating embodiments in more detail, it may be useful to consider the overall seismic exploration process in general for context. As generally discussed above, one purpose of seismic exploration is to render the most accurate graphical representation possible of specific portions of the Earth's subsurface geologic structure, e.g., using the seismic data which is collected as described above with respect to FIG. 1. The images produced allow exploration companies to accurately and cost-effectively evaluate a promising target (prospect) for its oil and gas yielding potential (e.g., hydrocarbon deposits 120).

FIG. 3 illustrates a generalized method 300 for seismic exploration which includes both the acquisition of the seismic data described above, and the subsequent processing of that seismic data to form such images. In FIG. 3, the overall process is broken down into five steps, although one could of course characterize seismic exploration in a number of different ways. Step 302 references the initial positioning of the survey equipment in the geographic area of interest (GAI) and the preparation to begin surveying the GAI in a manner which is precise and repeatable. Seismic waves are generated by the afore-described sources or vibrators (step 304), and data recording is performed on the reflected, scattered and surface waves by the receivers (step 306). In step 308, processing of the raw, recorded seismic data occurs. Data processing generally involves numerous processes intended to, for example, remove noise and unwanted reflections from the recorded data and involves a significant amount of computer processing resources, including the storage of vast amounts of data, and multiple processors or computers running in parallel. Such data processing can be performed on site, back at a data processing center, or some combination thereof. Finally, in step 310, data interpretation occurs and the results can be displayed or generated as printed images, sometimes in two-dimensional form, more often now in three dimensional form. Four dimensional data presentations (i.e., a sequence of 3D plots or graphs over time) are also possible outputs, when needed to track the effects of, for example, extraction of hydrocarbons from a previously surveyed deposit.

With this context in mind, various embodiments provide for increasing the amplitude of the emitted signal (i.e., the transmitted signal) of a seismic vibrator source by mixing a variable amount of odd order harmonics, in a proportion chosen so that there is no increase in any of the required force, oil flow rate, or mass displacement, depending on the amplitude limiting factor(s) at the frequency considered. According to further embodiments, the proportion of odd order harmonics can either be chosen so that the amplitude of the fundamental is maximized, so that the amplitude of the fundamental is kept constant while the amplitude of harmonics is maximized, or so that the overall total power radiated into the ground is maximized, in all cases without exceeding the limiting factors defined above.

The maximum force a hydraulic vibrator can send is constrained by a number of parameters, including: (a) the amplitude of the force exerted by baseplate 288 onto ground 275; and (b) the maximum displacement of reactive mass 284 with respect to baseplate 288. For hydraulic vibrators 102, there are at least two additional constraints: (1) the average oil flow, which for simple signals, is proportional to the maximum displacement multiplied by the frequency and is otherwise proportional to the average absolute value of reaction mass 284 velocity with respect to baseplate 288; and (2) the peak oil flow.

As mentioned above, a sweep signal which applies this force to the ground using, e.g., the equipment described above with respect to FIGS. 1 and 2, has conventionally been defined as:

$$s_{ref}(t)=F_{ref}(f(t))\sin(\varphi(t)) \quad (1),$$

where $F_{ref}(f)$ is the amplitude of the sweep signal as a function of the frequency, $f(t)$ is the instantaneous frequency emitted as a function of time and $\varphi(t)$ is the instantaneous phase, defined by:

$$\varphi(t)=\varphi_0+\int_0^t 2\pi f(u)du \quad (2),$$

where $\varphi_0$ is the initial phase. By way of contrast, these exemplary embodiments add one or more odd order harmonic components to the sweep signal in a way which increases the amplitude or power of the force signal being applied to the ground. For example, according to one embodiment, a modified sweep signal with added third order harmonics can be defined as:

$$s(t)=F(f(t))[\sin(\varphi(t))+k(f(t))\sin(3\varphi(t))] \quad (3),$$

where the function $k(f(t))$ is a function which defines the amplitude or amount of the third order harmonic with respect to the fundamental that is used in the sweep signal $s(t)$ at a given frequency. Note that, as will be described in more detail below, the embodiments are not limited to the addition of third order harmonics, but can also use other odd order harmonics (e.g., fifth order harmonics) or multiple odd order harmonic terms (e.g., third and fifth order harmonics). Additionally, note that a more general scheme could be implemented wherein the third (or any) harmonic may have a phase offset. As known to those of skill in the art, in order to better shape the amplitude spectrum of the sweep, such signal $s(t)$ can be multiplied by a taper function so that the amplitude increase smoothly from and decrease smoothly towards zero at the beginning and the end of the sweep respectively.

From the foregoing, it will be appreciated by those skilled in the art that the identification of an appropriate $k(f(t))$ is significant to these embodiments as the addition of too much, or too little, of the odd order harmonic component to the sweep signal $s(t)$ will result in a non-optimized amplitude. Moreover, $k(f(t))$ will vary based on the characteristics of the vibrator being used in the seismic acquisition system and will vary based upon the afore-described amplitude constraints. Accordingly, the following discussion illustrates how $k(f(t))$ can be determined according to an embodiment in such a way that it will increase the amplitude or power of the seismic sweep signal in a desired manner.

Under the quasi-steady state assumption, and with the further assumption that the baseplate remains immobile (e.g. under the ground resonance frequency), the motion of the reaction mass can be summarized as:

$$a_{ref}(t) \approx \frac{1}{m_R}s_{ref}(t) \quad (4)$$
$$\approx \frac{1}{m_R}F_{ref}(f(t))\sin(\varphi(t)),$$

$$v_{ref}(t) \approx v_0 + \int_0^t a_{ref}(u)du \quad (5)$$
$$\approx -\frac{F_{ref}(f(t))}{m_R 2\pi f(t)}\cos(\varphi(t)),$$

$$x_{ref}(t) \approx x_0 + \int_0^t v_{ref}(u)du \quad (6)$$
$$\approx -\frac{F_{ref}(f(t))}{m_R(2\pi f(t))^2}\sin(\varphi(t)),$$

where $a_{ref}$ is the acceleration of the reaction mass, $v_{ref}$ is the velocity of the reaction mass, $x_{ref}$ is the position of the reaction mass, and $m_R$ is the mass of the reaction mass.

In the case of an hydraulic vibrator, a flow of high pressure oil $Q_{ref}(t)$ necessary to drive the actuator as the reaction mass moves relatively to the piston rod:

$$Q_{ref}(t) = A|v_{ref}(t)| \quad (7)$$
$$= \frac{F_{ref}(f(t))}{m_R 2\pi f(t)}|\cos(\varphi(t))|,$$

where A is the cross section of the hydraulic actuator. At a given frequency f, the average flow of oil Qave(f) needed over a period of the movement of the reaction mass is:

$$Qave(f) \approx A\frac{F_{ref}(f)}{m_R \pi^2 f}. \quad (8)$$

Those of skill in the art can further appreciate that the amplitude of the sweep signal, $F_{ref}(f)$ associated with the foregoing equations is constrained over different frequency ranges by several factors that are associated with the characteristics of the vibrator source of interest, specifically:

1. The amplitude of the force exerted by the baseplate onto the ground cannot exceed the hold-down weight $F_{HD}$ of the vibrator, otherwise the baseplate will decouple from the ground. It cannot exceed either the rated peak force of the vibrator ($F_{peak}$), which constrains the acceleration of reaction mass 284:

$$F_{ref}(f) \leq F_{HD}; \text{ and } F_{ref}(f) \leq F_{peak} \quad (9).$$

2. The maximum amplitude of the force exerted by the baseplate onto the ground should not exceed a maximum desirable force setting $F_{set}$. Typically, $F_{peak}$ is greater than the hold down weight $F_{HD}$ so the force setting $F_{set}$ is usually chosen between 70% and 90% of the hold down weight $F_{HD}$:

$$F_{ref} \leq F_{set} \quad (10).$$

3. Combining constraints (1) and (2) from above, the amplitude of the force exerted by the baseplate onto the ground should not exceed a force $F_{max}$, defined as the minimum of $F_{set}$ and $F_{HD}$:

$$F_{ref}(f) \leq F_{max}, \text{ where } F_{max}=\min(F_{set}, F_{HD}, F_{peak}) \quad (11).$$

4. Another factor that will affect $F_{ref}(f)$, is the maximum available stroke of the mass, which constrains the displacement of reaction mass 284. $X_{max}$ is defined as half of the available stroke:

$$|x_{ref}| \leq X_{max} \text{ i.e., } F_{ref}(f) \leq X_{max} m_R (2\pi f)^2 \quad (12).$$

5. Furthermore, in the case of a hydraulic vibrator, the flow rate of high pressure oil needed by the actuator cannot exceed the flow rate that the oil pump and accumulator can provide. Since the accumulators have a limited volume, the average oil flow needed over a period of oscillation should not exceed the rated flow $Q_{pump}$ of the hydraulic pump:

$$Qave \leq Q_{pump}, \quad (13a)$$

or $$F_{ref}(f) \leq \pi^2 m_R Q_{pump} \frac{f}{A}. \quad (13b)$$

6. Finally, in the case of a hydraulic vibrator, the instantaneous flow rate of high pressure oil needed by the actuator should not exceed a desirable limit $Q_{max}$:

$$|Q_{ref}| \leq Q_{max}, \quad (14a)$$

i.e.

$$F_{ref}(f) \leq \pi m_R Q_{pump} \frac{f}{(2A)}. \quad (14b)$$

As known by those of skill in the art, the variables $F_{HD}$, $Q_{pump}$, and $X_{max}$, are values that are inherent to seismic vibrator 102, 271 used to generate the signal. The variables $F_{set}$ and $Q_{max}$ correspond to maximum desired parameters for seismic vibrator 102, 271.

Thus, to define the different frequency ranges over which each of these constraints applies, it is convenient to define frequencies $f_{stroke}$, $f_{pump}$ and $f_{flow}$ as:

$$f_{stroke}=(1/2\pi)\cdot\sqrt{F_{max}/(X_{max}\cdot m_R)} \quad (15)$$

and $$f_{pump}=F_{max}\cdot A/(\pi^2 \cdot Q_{pump}\cdot m_R) \quad (16),$$

and $$f_{flow}=2\cdot F_{max}\cdot A/(\pi\cdot Q_{max}\cdot m_R) \quad (17),$$

so that the four constraints on the amplitude $F_{ref}(f)$, can be expressed together as—

$$\frac{F_{ref}(f)}{F_{max}} \leq \min\left(1, \frac{f}{f_{flow}}, \frac{f}{f_{pump}}, \frac{f^2}{f_{stroke}^2}\right). \quad (18)$$

A new factor, $K_{ref}(f)$, associated with these combined amplitude constraints can then be defined as a function of frequency as—

$$K_{ref}(f) = \min\left(1, \frac{f}{f_{flow}}, \frac{f}{f_{pump}}, \frac{f^2}{f_{stroke}^2}\right), \quad (19)$$

so that the amplitude constraint can be re-written as—

$$F_{ref}(f) \leq F_{max} \times K_{ref}(f) \quad (20).$$

The four constraints on the amplitude $F_{ref}(f)$, described above, and according to embodiments, do not all need to be taken into account when designing the sweep. According to further embodiments, a determination can be made, for example, that the reference sweep fits into the force, average flow, and stroke constraints, without checking the maximum flow constraint, or, alternatively, in the cases of a non-hydraulic vibrator, check only the stroke and force constraints. Any and all other combinations are possible according to the embodiments described herein.

In order to understand how to select or determine k(f(t)) to desirably add an appropriate amount of odd order harmonic content to a sweep signal according to these embodiments, another mathematical function, H, which illustrates the effect of adding an odd order harmonic to the amplitude of a sinusoidal signal, will now be introduced and discussed. More specifically, the function H maps a maximum value of the sinusoidal function having a fundamental component and a third order harmonic component over the period t=0 to $2\pi$, for various amounts or amplitudes of the third order component relative to the fundamental component. Thus, the function H can be defined (for the addition of third order harmonic content) as:

$$H(k)=\max_{t\in[0,2\pi]}(\sin t+k\cdot \sin 3t)=\max_{t\in[0,2\pi]} (\cos t-k\cdot \cos 3t) \quad (21),$$

where the variable k is a value which represents the proportion or amount of a harmonic component relative to the fundamental component, that is, the relative amplitude of the third order harmonic; and the variable t is time. Equation (21) can also be expressed as:

$$H(k)=\max_{t\in[0,2\pi]}((1+3k)\sin t-4k\cdot \sin^3 t) \quad (22), \text{ or}$$

$$H(k)=\max_{u\in[-1,1]}((1+3k)u-4k\cdot u^3) \quad (23)$$

Figure 4A:
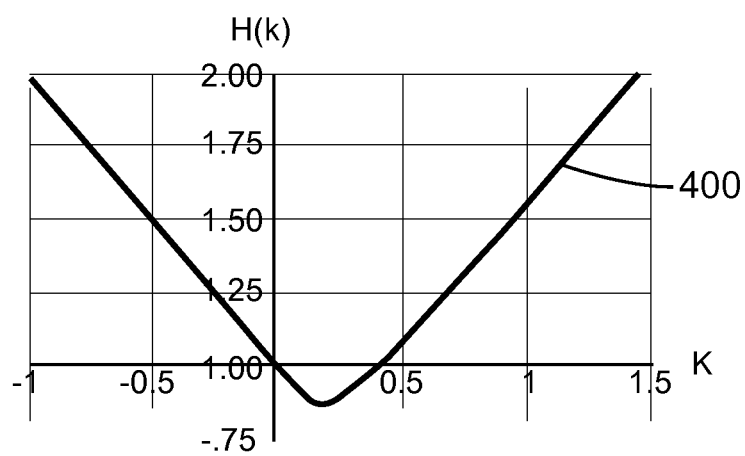
FIG. 4A illustrates a plot of a function H(k)
Figure 4B:
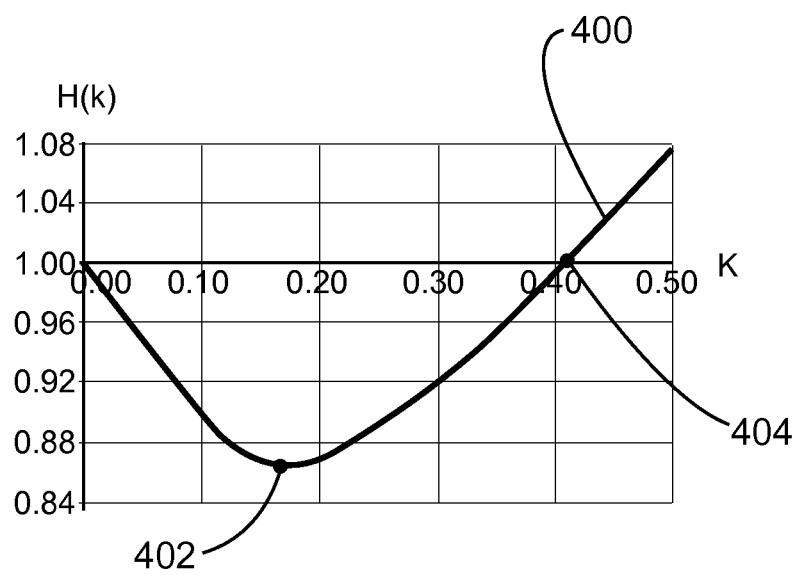
FIG. 4B illustrates a magnified view of the plot of the function H(k) shown in FIG. 4A

The function H exhibits some interesting characteristics which can be used to determine k(f(t)) as described below, some of which can be seen by plotting this function as shown in FIGS. 4A and 4B. FIG. 4A illustrates a plot of H(k) 400, and FIG. 4B illustrates a magnified view of the plot of H(k) shown in FIG. 4A for values of k around the minimum of H(k). Of particular interest in FIG. 4B, it can be seen that H(k) exhibits a minimum 402 at k=⅙, wherein $$H\left(\frac{1}{6}\right) = H_{min} = \frac{\sqrt{3}}{2} \approx 0.866; \quad (24a)$$

$$\frac{dH}{dk}\left(\frac{1}{6}\right) = 0; \quad (24b)$$

$$H(0) = H(k_1) = 1; \text{ and} \quad (24c)$$

$$k_1 = \frac{2\sqrt{3}\cos\left(\frac{5\pi}{18}\right)-1}{3} \approx 0.409, \quad (24d)$$

which is point 404 as shown in FIG. 4B. Thus, upon evaluating the function H(k), one skilled in the art will appreciate that by adding certain amounts k of the third order harmonic to the fundamental frequency, the summed sweep signal of equation (3) will have a peak amplitude which is less than that of the fundamental frequency itself (i.e., those values of k in the graph which result in an H(k) value that are below the value H(k)=1). Conversely, where the peak value of a parameter is a limiting factor, we can boost the amplitude by up to $2/\sqrt{3}$ then add some $3^{rd}$ order harmonic content to control the peak value attained and make sure it does not exceed the maximum taken by the reference signal:

$$\max_{t\in[0,2\pi]}\left(\frac{1}{H(k)}\sin t + \frac{k}{H(k)}\cdot\sin 3t\right) = 1 = \max_{t\in[0,2\pi]}(\sin t). \quad (25)$$

When looking at the physical constrains on the force amplitude of a seismic sweep, this can be applied either to the force itself or to control the mass maximum displacement.

Other properties of H include the following:

$$H(k) = 1 - k \quad (26a)$$

for $$k \leq \frac{1}{9},$$

and $$H(k) = \left(k + \frac{1}{3}\right)\cdot\sqrt{1 + \frac{1}{3k}} \quad (26b)$$

for $$k \geq \frac{1}{9},$$

with $$H(k) \sim k + \frac{1}{2} \quad (26c)$$

for $$k \gg 1.$$

Further, $$\frac{dH}{dk}(k) = -1 \quad (26d)$$

for $$k \leq \frac{1}{9},$$

and $$\frac{dH}{dk}(k) = \left(1 + \frac{1}{6k} - \frac{1}{18k^2}\right)\frac{1}{\sqrt{1+\frac{1}{3k}}} \quad (26e)$$

for $$k \geq \frac{1}{9}.$$

In addition, $$H(k) < 0.87 \quad (26f),$$

for 0.14<k<0.20, approximately, which is very close to $H_{min}$. Finally, $$\max_{t\in[0,2\pi]}(\cos t + k\cdot\cos 3t) = \max_{t\in[0,2\pi]}(\sin t - k\sin 3t) = H(-k) \quad (27).$$

Figure 5A:
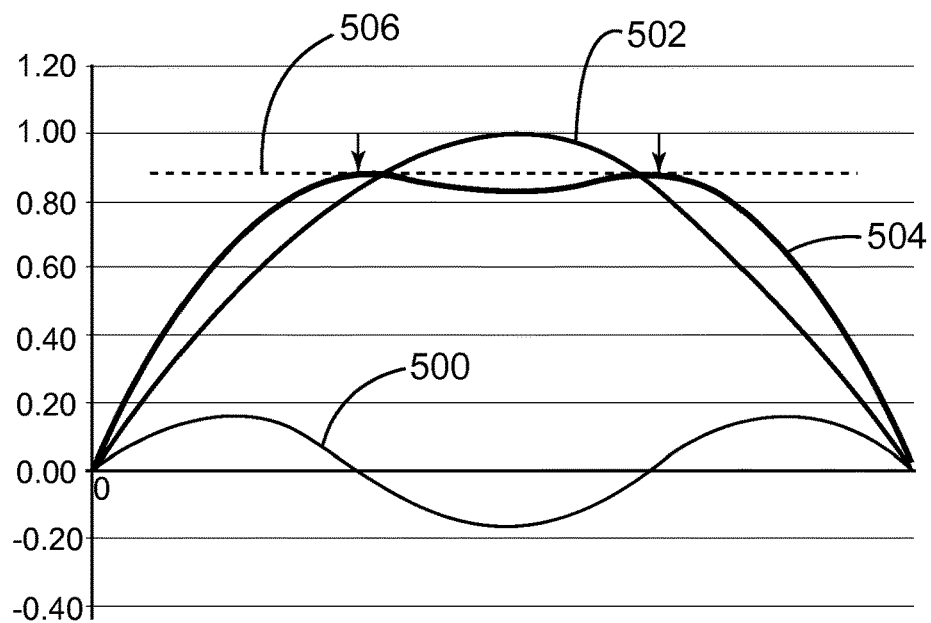
FIGS. 5A and 5B illustrate addition of different amounts of a third order harmonic to a fundamental frequency signal for a function H(k)

For example, see FIG. 5A wherein a third harmonic component sin(3t) 500 having a k value of ⅙ (i.e., the H(k) minimum 402) is plotted along with the fundamental frequency sin(t) 502. Upon summing these two functions 500 and 502, it can be seen that the amplitude of the composite function 504 is less than that of the fundamental frequency itself (as shown by the dotted line 506 and arrows in the figure).

Figure 5B:
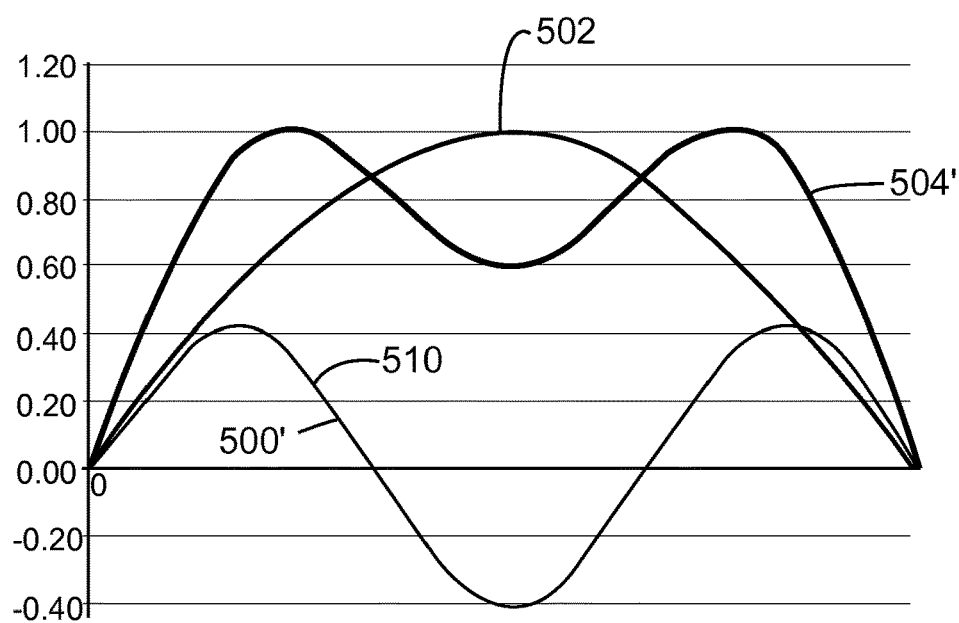

Conversely, by adding a different amount of the third harmonic element to the fundamental frequency, one can, for example, generate a composite function that has the same peak amplitude as that of the fundamental frequency by itself, that contains the same fundamental component as the fundamental frequency by itself, but that also includes a certain amount of third order harmonic. Referring now to FIG. 5B, it can be seen that by increasing the amplitude of the third order harmonic signal 500', and adding this third order harmonic signal 500' to fundamental frequency signal 502, the peak amplitude of composite signal 504' is the same as that of fundamental frequency signal 502. Consequently, it will further be appreciated this characteristic associated with the addition of varying amounts of odd order harmonic(s) to a fundamental frequency sweep can be used to boost the amplitude of the composite signal in a desired manner, using the property:

$$\max_{t\in[0,2\pi]}(\sin t) = 1 = \max_{t\in[0,2\pi]}\left(\frac{1}{H(k)}\cdot\sin t + \frac{k}{H(k)}\cdot\sin 3t\right). \quad (28)$$

Another function J can now be introduced that is needed to calculate the average oil flow for a composite signal (i.e., one that includes the $3^{rd}$ order harmonic):

$$J(k) = \frac{1}{2}\int_0^\pi |\cos t + k\cos 3t|\,dt = \frac{1}{2}\int_0^\pi |\sin t - k\sin 3t|\,dt. \quad (29)$$

The function J represents the average absolute value of a sinusoidal function with a certain proportion k of third order harmonic added. It is useful to compute the average oil flow required by a hydraulic vibrator. There are a few important properties of J(k) below:

$$J(k) = 1 - \frac{k}{3}, \quad (30a)$$

for $$-1 \leq k \leq \frac{1}{3}.$$

$$J(k) = 1 - \frac{k}{3} - \frac{2}{3}(k+1)\sqrt{1 + \frac{1}{k}}, \quad (30b)$$

for $$k \leq -1$$

$$J(k) = -1 + \frac{k}{3} + \frac{2}{3}(k+1)\sqrt{1 + \frac{1}{k}}, \quad (30c)$$

for $$k \geq \frac{1}{3}$$

J reaches a minimum at $$k_{J,min} = \frac{2}{\sqrt{3}}\cos\frac{7\pi}{18} \approx 0.395, \quad (30d)$$

where $$J(k_{J,min}) = J_{min} \approx 0.8794$$

and $$H(k) < 0.90$$

for $$0.30 < k < 0.50,$$

approximately, very close from $J_{min}$. In addition, $$J(0) = J(k_2) = 1, \quad (30e)$$

with $$k_2 = -\frac{8}{3} + \frac{4}{3}\sqrt{22}\cos\left(\frac{1}{3}\arccos\frac{-409}{88\sqrt{22}}\right) \approx 0.701.$$

Using the above qualities and properties of H(k) with the sweep signal s(t), a standard single frequency sweep signal can be converted from—

$$S_{ref}(t)=F_{ref}(f(t))\sin(\varphi(t)) \quad (31),$$

into an improved sweep signal according to embodiments, i.e., as stated in equation (3) introduced above, or equivalently as $$s(t)=F(f(t))[\sin(\varphi(t))+k(f(t))\sin(3\varphi(t))] \quad (32),$$

where k(f) is a function defining the amplitude of the 3rd order harmonic with respect to fundamental to be chosen, for example, as described below. The value of k is chosen such that the amplitude of the force is maximized. Under the quasi steady-state assumption, and assuming additionally that the movements of the baseplate are negligible (which stands true below ground resonance frequency), the equations of motion for the reaction mass, under the same assumptions, become:

$$a(t) \approx \frac{1}{m_R}s(t) \approx \frac{1}{m_R}F(f(t))(\sin(\varphi(t))+k(f(t))\sin(3\varphi(t))), \quad (33)$$

$$v(t) \approx v_0 + \int_0^t a(u)du \approx \frac{-F(f(t))}{m_R 4\pi^2 f(t)^2}\left(\cos(\varphi(t))+\frac{k(f(t))}{9}\cos(3\varphi(t))\right). \quad (34)$$

$$x(t) \approx x_0 + \frac{1}{m_R}\int_0^t v(u)du \approx \quad (35)$$

$$\frac{-F(f(t))}{m_R 4\pi^2 f(t)^2}\left(\sin(\varphi(t))+\frac{k(f(t))}{9}\sin(3\varphi(t))\right).$$

The instantaneous oil flow in order to move the reaction mass is:

$$Q(t)=A|v(t)| \quad (36)$$

and its average over a period is approximately:

$$\langle Q\rangle(f) \approx A\frac{F(f)}{m_R 2\pi f}\left\langle\left|\cos\varphi(t)+\frac{k(f(t))}{3}\cos 3\varphi(t)\right|\right\rangle \approx \quad (37)$$

$$A\frac{F(f)}{m_R\cdot\pi^2\cdot f}J\left(\frac{k(f)}{3}\right).$$

The constraints on the peak amplitude of the force F of the vibrator become:

$$s(t)\leq F_{max}, \text{ otherwise stated as: } F(f)/F_{max}\leq 1/H(k) \quad (37)$$

In addition, there are other limitations. For example, the required oil flow should not exceed the pump capacity:

$$\langle Q(f)\rangle \leq Q_{max}, \quad (38)$$

or, $$F(f) \leq f\frac{Q_{max}\pi^2 m_R}{AJ\left(\frac{k(f)}{3}\right)}, \quad (39)$$

or, $$F(f) \leq \frac{1}{J\left(\frac{k(f)}{3}\right)}\frac{f}{f_{pump}}F_{max}. \quad (40)$$

The stroke of the mass constrains the displacement of the reaction mass:

$$|x(t)| \leq X_{max}, \quad (41)$$

or, $$F(f) \leq \frac{X_{max}m_R(2\pi f)^2}{H\left(\frac{k(f)}{9}\right)}, \quad (42)$$

or, $$F(f) \leq \frac{1}{H\left(\frac{k(f)}{9}\right)}\frac{f^2}{f_{stroke}^2}F_{max}. \quad (43)$$

Finally, the peak oil flow should not exceed the maximum desire flow:

$$Q(t) \leq Q_{peak}, \quad (44)$$

or, $$\frac{AF(f)}{m_R 2\pi f}H\left(-\frac{k(f)}{3}\right) \leq Q_{max}, \quad (45)$$

or, $$F(f) \leq \frac{1}{H\left(\frac{-k(f)}{3}\right)}\frac{f}{f_{flow}}F_{max}. \quad (46)$$

Overall, there is a similar limitation on the amplitude of the signal at a given frequency. If we define:

$$K(f,k) = \min\left(\frac{1}{H(k)}, \frac{f}{f_{flow}}\frac{1}{J\left(\frac{k}{3}\right)}, \frac{f^2}{f_{stroke}^2}\frac{1}{H\left(\frac{k}{9}\right)}, \frac{f}{f_{flow}}\frac{1}{H\left(\frac{-k}{3}\right)}\right), \quad (47)$$

then:

$$F(f) \leq F_{max}K(f,k(f)). \quad (48)$$

It is desirable that F(f) be as high as possible. We thus define the function $k_{max}(f)$ as the value of k that, at a given frequency f, maximizes K(f, k), and we choose as amplitude $$F(f)=F_{max}K(f,k_{max}(f)) \quad (49).$$

With this method, we can thus convert a "standard" single frequency sweep $$s_{ref}(t)=F_{ref}(f(t))\sin(\varphi(t)) \quad (50)$$

into an improved sweep signal—

$$s(t)=F(f(t))\sin\varphi(t)+k_{max}(f(t))F(f(t))\sin(3\varphi(t)) \quad (51),$$

where the fundamental will be emitted at a higher amplitude, while still remaining within the mechanical constraints of the vibrator. The amplitude of the fundamental of this new sweep is increased by a factor $$\eta(f) = \frac{K(f, k_{max}(f))}{K_{ref}(f)}, \quad (52)$$

with $$1 \le \eta(f). \quad (53)$$

Figure 6:
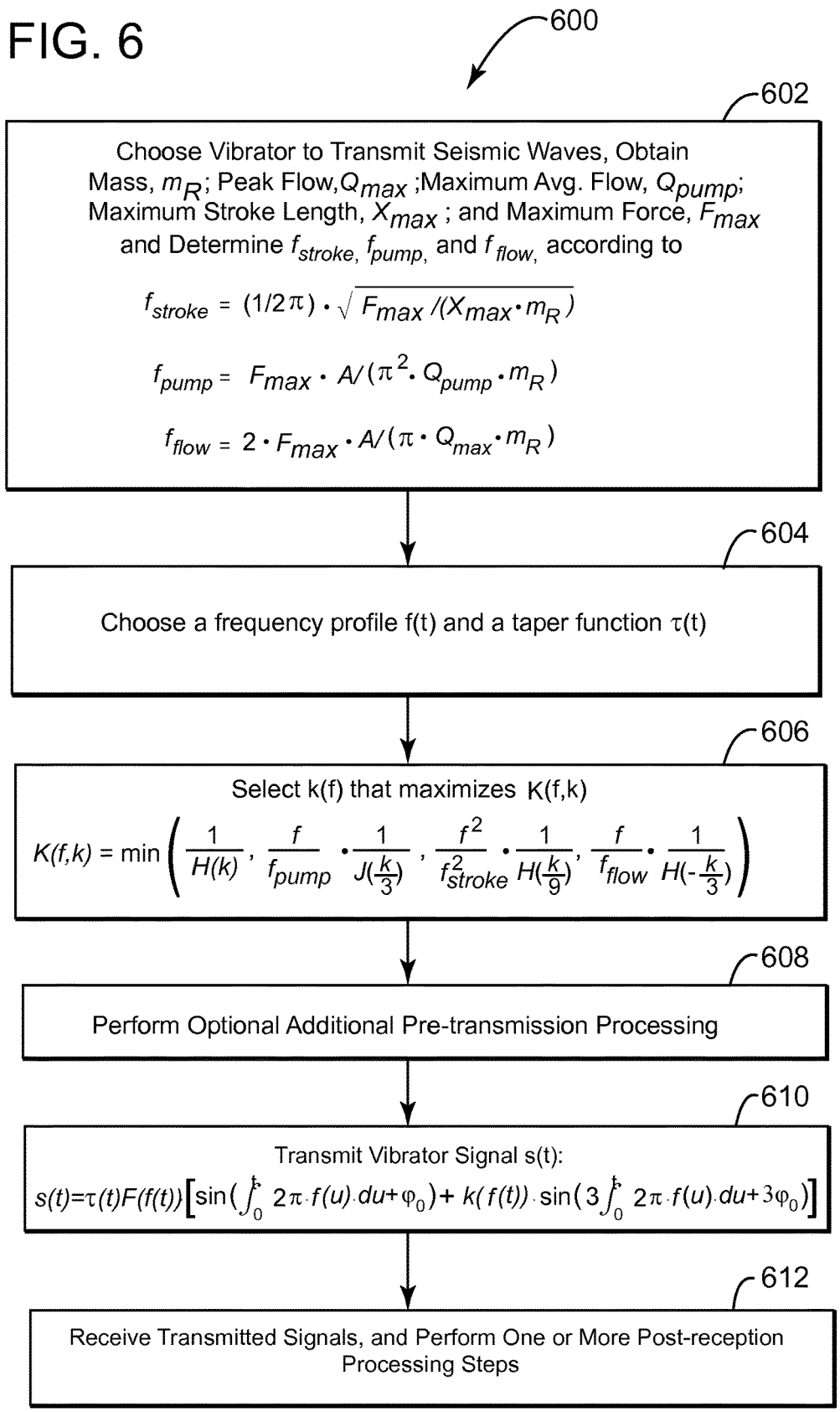
FIG. 6 illustrates a flow chart of a method for generating frequency sweep signals with a third order harmonic component of the fundamental signal for use with vibrators in a land seismic exploration system according to an embodiment.

To illustrate how k(f) can be selected or determined according to embodiments, FIG. 6 illustrates a flow chart of method 600 for generating frequency sweep signals with a $3^{rd}$ order harmonic component for use with vibrators in a land seismic exploration system. Method 600 begins with step 602, wherein a vibrator of known specification is selected to generate the frequency sweep signal. Each vibrator will have a known maximum peak flow, $Q_{max}$, maximum average flow $Q_{pump}$, maximum stroke length, $X_{max}$, and maximum force, $F_{max}$, as discussed. Further, $f_{stroke}$, $f_{pump}$ and $f_{flow}$ are characteristics of the vibrator, determined according to Equations (n) to (m), respectively, as discussed above, and thus are known once the particular vibrator is selected.

In step 604, the sweep parameters are selected. For example, a frequency interval is selected. Although not discussed above, frequency ranges for frequency sweep signals for land seismic exploration are known to those of skill in the art, and generally last about 7 to 35 seconds, with frequencies from about 8 to about 80 Hz, or visa-versa (up versus down frequency sweep); these can also be referred to as $f_{start}$ ("beginning" frequency) to $f_{end}$ ("final" frequency). As those of skill in the art can further appreciate, sweeps can be pseudo-random, and non-linear. Non-linear sweeps include, generally, more high frequency signals, and the result is that the high frequency content increases, and thus the resolution. The sweep length is also determined, and the amplitude, F(f), of the primary or fundamental signal.

In the next step, method step 606, the amplitude of the $3^{rd}$ order harmonic is determined according to an embodiment. First of all, a function K(f,k) is defined, which combines a plurality of the constraints on the amplitude of the force. The function K(f,k) may be defined as:

$$K(f, k) = \min\left(\frac{1}{H(k)}, \frac{f}{f_{pump}} \frac{1}{J\left(\frac{k}{3}\right)}, \frac{f^2}{f_{stroke}^2} \frac{1}{H\left(\frac{k}{9}\right)}, \frac{f}{f_{flow}} \frac{1}{H\left(-\frac{k}{3}\right)}\right). \quad (54)$$

It may also be defined by taking into account only some of the constraints, for instance:

$$K(f, k) = \min\left(\frac{1}{H(k)}, \frac{f}{f_{pump}} \frac{1}{J\left(\frac{k}{3}\right)}, \frac{f^2}{f_{stroke}^2} \frac{1}{H\left(\frac{k}{9}\right)}\right), \quad (55)$$

or, $$K(f, k) = \min\left(\frac{1}{H(k)}, \frac{f}{f_{pump}} \frac{1}{J\left(\frac{k}{3}\right)}\right), \quad (56)$$

or, $$K(f, k) = \min\left(\frac{1}{H(k)}, \frac{f^2}{f_{stroke}^2} \frac{1}{H\left(\frac{k}{9}\right)}\right), \quad (57)$$

or, $$K(f, k) = \frac{1}{H(k)}. \quad (58)$$

The last two formulations (Equations (57) and (58)) are in particular applicable for the transmission of a seismic wave with a non-hydraulic vibratory source, for which there are no constraints related to the flow rate of oil.

For this embodiment, the amplitude of the $3^{rd}$ order harmonic, k(f), is chosen such that there is an interval of frequencies over which k(f) is, for a given f, the value of k that maximizes the selected function K(f,k).

K(f,k) is an equation derived from the four vibrator constraints (hence three elements in equation (54)), described above with respect to peak force, maximum oil flow, average oil flow and stroke, the frequencies $f_{stroke}$, $f_{pump}$ and $f_{flow}$ set forth in Equations (15)-(17), H(k) described above with respect to Equation (21) and J(k) described above with respect to Equation (29). The value k, as discussed above, is the relative amplitude of the third order harmonic in relation to the fundamental (and is, as defined, frequency dependent). Those of skill in the art can appreciate that the embodiments described herein are not limited to embodiments where k(f) is chosen such that there is an interval of frequencies over which k(f) is, for a given f, the value of k that maximizes the function K(f, k). That is, other selection criteria exist for k(f) such as are described below.

Method 600 then proceeds to step 608, wherein optional additional pre-transmission processing can occur. Then, in step 610, method 600 proceeds to define the transmitted signal according to the following equation, and forwards the signal to the vibrator, hence causing transmission of the signal s(t), defined as follows:

$$s(t) = F(f(t))[\sin(\int_0^t 2\pi f(u) du + \varphi_0) + k(f(t))\sin(3\int_0^t 2\pi f(u) du + 3\varphi_0)] \quad (59).$$

In equation (59) for the transmitted signal, s(t), the initial phase $\varphi_0$ is a number in the interval [0, 2π] (though the initial phase can be set to 0, for simplicity)], and f(t) is the instantaneous frequency of the fundamental of the signal s(t).

In method step 612, the balance of signal processing occurs, which, as described above, can include digitization of the received signals, cross- and auto-correlation of the transmitted and received signal, multiples removal and/or suppression, interpolation, among many other seismic signal processing steps known to those of skill in the art.

Above, in regard to step 606, the determination of the value of k(f) was described as satisfying certain criteria. There are other ways to define the determination of the value of k(f), according to further embodiments. According to still a further exemplary embodiment, k(f) is chosen such that there is an interval of frequencies over which k(f) is, for a given f, the value of k among those such that K(f,k)=K(f,0), where the absolute value of k is the maximum value. According to still a further embodiment, k(f) is chosen such that there is an interval of frequencies over which k(f) is such that K(f,k(f))>K(f,0). According to still a further embodiment, k(f) is chosen such that one or more of the previously defined conditions for choosing k(f) are combined on separate intervals of frequencies. Those skilled in the art will appreciate that there may also be other optimal selections for k(f) depending upon the implementation.

The method described above may be used regardless of the frequency profile f(t) chosen by the user, which may be constant or vary over time. In the case of a variable frequency profile, the frequency profile affects the frequency spectrum of the transmitted signal, which is usually an attribute that is sought to match a desired target. In another embodiment, a method to select the frequency profile according to a target frequency spectrum $F_{target}(f)$. The initial frequency may be defined as the desired beginning frequency: $f(0)=f_{start}$. The frequency profile may then be built by picking a positive constant $\alpha$ and numerically solving a differential equation, for instance by using one of the Runge-Kutta methods. The differential equation is defined as:

$$\frac{df}{dt}(t) = \alpha \frac{F_{max}^2}{F_{tgt}(f(t))^2} K(f, k(f(t)))^2 \frac{f_{end} - f_{start}}{T}. \quad (60)$$

Thus it will be appreciated that techniques described herein can be exploited to alter the frequency vs. time profile, particularly for low dwell sweeps. This alteration of the frequency vs. time profile can, for example, be performed to increase low frequency content and/or to boost productivity by reducing sweep time. For example, a 10 percent increase in the fundamental amplitude means that the sweep rate can be increased by 20 percent at those frequencies which saves a lot of time. If signature deconvolution schemes (e.g., HFVS™) which can map the harmonics to their proper place are employed, then the energy at the higher frequencies is also increased. According to a further embodiment, the constant $\alpha$ can be iteratively adjusted in order have the frequency profile reach a desired final frequency $f_{end}$ after a time T has elapsed, where T is the desired duration of the sweep signal: $f(T)=f_{end}$. Since f(T) is a continuous and monotonous function of the constant $\alpha$, many root finding algorithms well known to those skilled in the art can be used in order to iteratively adjust $\alpha$ to a value such that the difference between f(T) and $f_{end}$ is lower than an acceptable error. At this point, according to a further embodiment, a taper function $\tau(t)$ can be chosen such that: $\tau(0)=\tau(T)=0$ and $\tau(t)=1$ over a large interval between 0 and T. The use of tapering signals at the beginning and end of the frequency sweep act to avoid large oscillations in the frequency spectrum. The signal that will then be transmitted is:

$$s(t)=\tau(t)F_{max}K(f(t),k_{max}(f(t)))(\sin \varphi(t)+k_{max}(f(t))\sin 3\varphi(t)) \quad (61),$$

wherein, the instantaneous phase is defined as:

$$\varphi(t)=\varphi_0+\int_0^t 2\pi f(u)du \quad (62).$$

The foregoing embodiments focused on the addition of a third order harmonic component to a fundamental sweep frequency signal. However, according to a further embodiment, not only can the $3^{rd}$ order harmonics be incorporated in the vibrator signal, but also higher odd order harmonic components. In this embodiment, therefore, a plurality of harmonic values are defined, as described in greater detail below. According to an embodiment, the definition of the signal $s_n(t)$ occurs in method step 610. According to an embodiment, $$s_n(t) = F_n(f(t))\left[\sin(\varphi(t)) + \sum_{i=1}^{n} a_i(f(t))\sin((2i+1)\varphi(t))\right], \quad (63)$$

where:

$$\varphi(t) = \varphi_0 + \int_0^t 2\pi f(u)du, \quad (64)$$

and the initial phase $\varphi_0$ is a number in the interval $[0,2\pi]$, n is a positive integer number between 1 and 10, f(t) is the instantaneous frequency of the fundamental of the signal to be sent to, or transmitted by the vibrator, $F_n(f)$ is the amplitude of the fundamental transmitted signal, and $a_i(f)$ defines the amplitude of $(2i+1)^{th}$ order harmonic with respect to fundamental. Equation (63) could also be modified to permit phase offset of the harmonic components.

According to an embodiment, the functions $a_i(f)$ are chosen such that there is an interval of frequencies over which $(a_1(f), \ldots, a_n(f))$ is the value of $(a_1, \ldots, a_n)$ that maximizes the function $K_n(f, a_1, \ldots, a_n)$ for frequency f (see, Equation (65-69) depending on the type of vibrator and the constraints sought to be minimized. According to still a further embodiment, $(a_1(f), \ldots, a_n(f))$ are chosen such that there is an interval of frequencies over which, at any frequency, at least one of the coefficients $a_i(f)$ is not equal to zero, and $K_n(f, a_1(f), \ldots, a_n(f))=K_n(f, 0, \ldots, 0)$. According to another embodiment, $(a_1(f), \ldots, a_n(f))$ are chosen such that there is an interval of frequencies over which $(a_1(f), \ldots, a_n(f))$ are such that $K_n(f, a_1(f), \ldots, a_n(f))>K_n(f, 0, \ldots, 0)$.

According to still a further embodiment, $(a_1(f), \ldots, a_n(f))$ are chosen such that one or more of the previous defined conditions for choosing $(a_1(f), \ldots, a_n(f))$ are combined on separate intervals of frequencies.

According to still a further embodiment, the function $K_n$ is a combination of plural constraints that limit the amplitude of the force that a vibratory source can apply onto the ground, and is defined as:

$$K_n(f, a_1, \ldots, a_n) = \min\left(\frac{1}{H_n(a_1, \ldots, a_n)},\right. \quad (65)$$

$$\frac{f}{f_{flow} \cdot J_n\left(\frac{a_1}{3}, \ldots, \frac{a_n}{2n+1}\right)}, \frac{f^2}{f_{stroke}^2 \cdot H_n\left(\frac{a_1}{9}, \ldots, \frac{a_n}{(2n+1)^2}\right)},$$

$$\left.\frac{f}{f_{flow} \cdot H_n\left(\frac{-a_1}{3}, \ldots, \frac{(-1)^n a_n}{2n+1}\right)}\right),$$

or, $$K_n(f, a_1, \ldots, a_n) = \min\left(\frac{1}{H_n(a_1, \ldots, a_n)},\right. \quad (66)$$

$$\left.\frac{f}{f_{flow} \cdot J_n\left(\frac{a_1}{3}, \ldots, \frac{a_n}{2n+1}\right)}, \frac{f^2}{f_{stroke}^2 \cdot H_n\left(\frac{a_1}{9}, \ldots, \frac{a_n}{(2n+1)^2}\right)}\right)$$

or $$K_n(f, a_1, \ldots, a_n) = \quad (67)$$

$$\min\left(\frac{1}{H_n(a_1, \ldots, a_n)}, \frac{f}{f_{flow} \cdot J_n\left(\frac{a_1}{3}, \ldots, \frac{a_n}{2n+1}\right)}\right),$$

or,

-continued $$K_n(f, a_1, \ldots, a_n) = \min\left(\frac{1}{H_n(a_1, \ldots, a_n)}, \frac{f^2}{f_{stroke}^2 \cdot H_n\left(\frac{a_1}{9}, \ldots, \frac{a_n}{(2n+1)^2}\right)}\right), \quad (68)$$

or, $$K_n(f, a_1, \ldots, a_n) = \frac{1}{H_n(a_1, \ldots, a_n)}. \quad (69)$$

wherein $f_{stroke}$, $f_{pump}$ and $f_{flow}$ are three frequencies defined according to specific characteristics of the vibrator, as discussed above.

According to still a further embodiment, the function FI describes the ratio of the peak amplitude of a signal containing harmonics to the peak amplitude of its fundamental component, as a function of the relative amplitude of the harmonic components. $H_n$ is defined as:

$$H_n(a_1, \ldots, a_n) = \max_{t \in [0, 2\pi]}\left(\sin t + \sum_{i=1}^n a_i \sin(2i+1)t\right), \quad (70)$$

According to still a further embodiment, the function $J_n$ describes the ratio of the average absolute value of a signal containing harmonics to the peak amplitude of its fundamental component, as a function of the relative amplitude of the harmonic components. $J_n$ is defined as:

$$J_n(a_1, \ldots, a_n) = \frac{1}{2}\int_0^\pi \left|\cos t + \sum_{i=1}^n a_i \cos(2i+1)t\right| dt, \quad (71)$$

According to still a further embodiment, $3^{rd}$ and $5^{th}$ order harmonic signals as described can be transmitted such that a force signal is emitted into the ground with a seismic vibrator that matches the description(s) above over an interval of time.

According to different aspects of the embodiments, there are different applications of the methods as embodied herein. The method may be used to boost the amplitude of a monochromatic signal, or narrow-band signal having a bandwidth smaller than twice its lowest frequency. In this case, the fundamental component extends on a frequency band that does not overlap with the frequency range of the harmonic components. Harmonics may be filtered out of the recorded signal by a well-chosen low-pass filter so that only the boosted fundamental component remains.

The usual practice for seismic surveys using a vibratory source is to use a swept frequency signal, also called "chirp" or "sweep". Such signal is chosen so that, when correlated with itself, it produces a sharp wavelet whose energy is focused in a short time interval centered around time zero. In this case, the cross-correlation of the recorded data with the reference chirp focuses the reflected wave packets into sharp impulsive events that approximate earth reflectivity.

In the case of a signal made of a fundamental swept frequency component and its harmonic, the correlation of the signal with itself is not the desired sharp wavelet centred at zero time. While the autocorrelations of the various harmonic components sum to produce such a sharp wavelet, the cross-correlations of component of different harmonic order appear as energy spread in positive and negative times. For a signal of frequency increasing with time, or "up-sweep", the cross-correlation of the full signal with its fundamental component only will result in a focused near-impulsive wavelet at time zero, and harmonic energy spread at negative time.

This can be detrimental, as the correlation of a recorded signal that include harmonic components with the fundamental of the reference signal will not only contain a fundamental component that approximates the reflectivity of earth but also, superimposed to it, a poorly focused harmonic component that is often considered as noise. This problem of contamination of the signal by harmonic distortion is well known to those skilled in the art, and as they can appreciate, a number of parameters affect how detrimental it can be to the recorded signal. The harmonic noise may have no detrimental effect at all if it falls out of the frequency bandwidth of the fundamental component.

Thus, according further embodiments, the detrimental effects of the harmonics added to the fundamental component can be evaluated and the amount of harmonics chosen so that these detrimental effects are overcome by the desirable increase in the amplitude of the fundamental component using the techniques described above. It may, further, be desirable to employ a source signature deconvolution technique to remap the harmonic energy to the main lobe. Moreover, it may further be useful to define the sweep rate of the sweep so that the odd harmonics, when correlated with the fundamental, all lie at the same lag.

Figure 7:
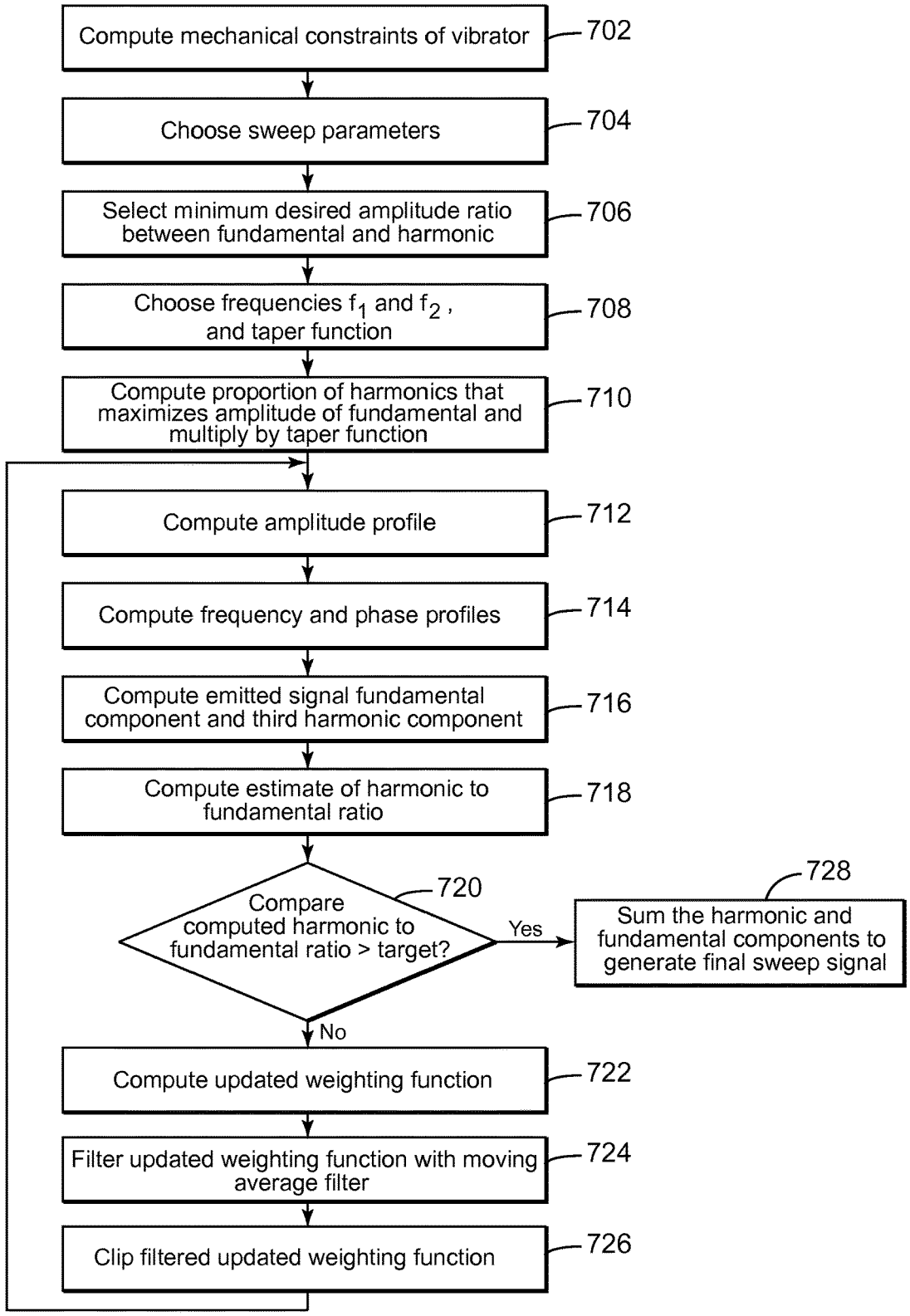
FIG. 7 illustrates a flow chart of another method for generating frequency sweep signals with a third order harmonic component of the fundamental signal for use with vibrators in a land seismic exploration system according to an alternate embodiment.

FIG. 7 illustrates a flow chart of an iterative method 700 for generating frequency sweep signals with a $3^{rd}$ harmonic component of the fundamental frequency for use with vibrators in a land seismic exploration system according to another embodiment. In method 700, the signal-to-noise ratio of the transmitted vibrator seismic signal is taken into account in an iterative manner to determine the correct k(f) factor to use in amplifying the $3^{rd}$ order harmonic according to an embodiment.

Method 700 begins with step 702 to 704, which are similar to the steps 602 to 604 from method 600. Thus, at steps 702 and 704, the mechanical constraints for the vibrator of interest and the sweep parameters are computed. In step 706, a minimum desired amplitude ratio between the fundamental and the harmonic is chosen. This signal-to-noise ratio $sn_{target}$ (f) may be constant or may depend on the frequency. For instance, a constant value of 15 dB may be chosen, i.e. $sn_{target}(f) = 10^{15/20} \approx 5.62$.

There is a maximum frequency that a vibrator can emit. Heavy vibrators typically have a maximum frequency rating in the 200-250 Hz range and offer somewhat degraded performances when operating at the upper end of the frequency bandwidth. There also exist vibrators rated to higher maximum frequencies by their manufacturer, e.g. 400 Hz. The frequency of the seismic signals used for seismic surveys targeting deep oil and gas reservoirs typically doesn't exceed 72 Hz, as higher frequencies tend to be totally attenuated over the long two-way travel from the source down to the target and back to the surface sensors. However, for imaging shallow target, or in areas where the absorption of seismic waves is limited, signals at 200 Hz or even higher frequencies may be used. While the fundamental component of the signal lies within the specifications of the vibrator, the frequency of the third and higher order harmonics may exceed the maximum rated frequency. In this case, it is not desirable to seek to emit the harmonic components. Besides the possible damage to the vibrator which may be caused by exceeding manufacturer's specifications, it is highly likely that the harmonics will fall out of phase, which is a key component in shaping the signal in a way to strengthen the fundamental component while not exceeding the vibrator mechanical constraints. For this reason, a frequency taper may be applied to the harmonic component, so that no harmonic component is emitted at a frequency that exceeds a desired limit set by the user, for instance the maximum rated frequency of the vibrator.

In step 708, two frequencies $f_1$ and $f_2$ are chosen, such that harmonics are emitted normally below $f_1$ and not emitted at all above $f_2$. A taper function $\psi$ may be chosen to weight the amount of harmonics emitted at a certain frequency, e.g., for the reasons discussed in the previous paragraph, as follows:

$$\begin{cases} \psi(f) = 1 \text{ for } f \leq f_1 \\ 0 < \psi(f) < 1, \text{ e.g. } \psi(f) = \frac{f_2 - f}{f_2 - f_1} \text{ for } f_1 < f < f_2 \\ \psi(f) = 0 \text{ for } f \geq f_2 \end{cases}$$

In step 710, the proportion of $3^{rd}$ order harmonic $k_{max}(f)$ that maximizes the amplitude of the fundamental signal for the chosen vibrator is calculated as per equation (49). The frequency taper $\psi$ is then applied in order to produce the harmonic content profile $k_0$, i.e.:

$$k_0(f) = k_{max}(f) \cdot \psi(f)$$

After these initial steps, an iterative procedure is put in place to determine the optimal value of k(f) to use in order to produce a seismic signal that fits within the vibrator constraints, maximizes the amplitude of the fundamental component while keeping it proportional to a target spectrum, and respects a prescribed maximum harmonic to fundamental amplitude ratio.

The first step of the iterative process is to build a signal from the harmonic signal $k_n(f)$, where n represents a loop iteration value that can have some maximum value which, when reached, may trigger an exit to the loop, e.g., via loop counter (not shown in FIG. 7. An amplitude profile $F_n(f)$ is built in step 712 from $k_n$ as per equation (49). In step 714, the frequency profile $f_n(t)$ is computed as per equation (60), and is numerically integrated into a phase profile $\varphi_n(t)$ as per equation (2). The fundamental components $s_F$ and the third harmonic component $s_3$ of the signal swept frequency may then be computed in step 716 as:

$$s_{F_n}(t) = \tau(t) \cdot F_n(f(t)) \cdot \sin(\int_0^t 2\pi f_n(u) \cdot du + \varphi_0)$$

$$s_{3_n}(t) = \tau(t) \cdot F_n(f(t)) \cdot k_n(f(t)) \cdot \sin(3\int_0^t 2\pi f_n \cdot du + 3\varphi_0)$$

Stated differently, the sweep signal which is built in steps 712-716 can involve choosing the frequency vs time profile as per equation (60), according to the amplitude profile and the target frequency spectrum, and then computing the actual sweep s(t) now that all the variables are known (as per equation (61)).

In step 718, an estimate of the harmonic to fundamental ratio, as a function of frequency, is calculated. The absolute value of the Fourier transform of the components $s_3$ and $s_F$ represents their amplitude spectrum. The ratio of these spectra provides a measure of the amount of harmonic energy compared to fundamental energy as shown below.

$$sn_n(f) = \frac{|\widetilde{sF_n}(2\pi \cdot f)|}{|\widetilde{s3_n}(2\pi \cdot f)|}$$

This fundamental to harmonic ratio may then be compared in step 720 to the target $sn_{target}(f)$ set at step 706. The iterative process stops as soon as $sn_n(f)$ exceeds $sn_{target}(f)$ for all frequencies within the sweep bandwidth, or after a preset number of iterations have been performed. Once one of these conditions is met, step 726 is performed. If however neither of these two conditions is met, the iterative process is continued by adapting the function k(f) beginning in step 722.

More specifically, the amount of harmonics k(f) may be adapted or adjusted to match the target if the amount of harmonics exceeds a desired level. For the frequencies between $f_{start}$ and $f_{end}/3$, for which the associated $3^{rd}$ order harmonic falls within the signal bandwidth, the function $k_i(f)$ is adjusted. The ratio $sn_n$ and $sn_{target}$ indicates the relative proportion of harmonic content with respect to the target. A value above one means that the harmonic content may be increased while remaining within the target. A value below one means that the harmonic content exceeds the target. The multiplication of $k_n$ by this ratio represents a good estimate of the optimal value to be chosen for k. It may however lead to an instability in the optimization algorithm, and it is in general preferable to choose a new value between the current one and the predicted one.

For example, this adaptation can be performed as described below with respect to steps 722, 724 and 726 in FIG. 7. The function $k_n$ is adjusted in step 722. For frequencies above $f_{end}/3$, it is left unchanged as the corresponding harmonics do not interfere with the fundamental signal. Below $f_{end}/3$, it is adjusted into a new function $k'_n$ such that:

$$\begin{cases} \text{for } f < \frac{f_{end}}{3}, k'_n(f) = k_n(f) \cdot \left( (1-C) + C \cdot \frac{sn_n(3f)}{sn_{target}(3f)} \right) \\ \text{for } f \geq \frac{f_{end}}{3}, k'_n(f) = k_n(f) \end{cases} \quad (72)$$

The constant C in equation (72) represents the weight of the predicted optimum value $k_n(f) \cdot sn_n(3f)/sn_{target}(3f)$, the current $k_n(f)$ value being weighted with (1−C). A typical value for C would be between 0.2 and 0.8, with values closer to 1 resulting in a faster convergence and values closer to 0 resulting in a more stable algorithm that converges more reliably towards a solution.

The new function $k'_n$ may show brisk variations, often due to ripples in the ratio $sn_n$, and may be smoothed by the application of a moving average filter in step 724. This may be done by convolving $k'_n$ by a normalized window function w. Such window function w may for instance be a symmetric triangular window w(f) of maximum value 1 and width 2 Hz.

$$k''_n = k'_n * w$$

The calculated function $k''_n$ may then be clipped in step 726 to ensure that it does not exceed the initial value $k_0$ by calculating:

$$k_{n+1}(f) = k''_n(f) \cdot \min\left(1, \frac{k_0(f)}{k''_n(f)}\right)$$

Once this step 726 has been performed, the new profile $k_{n+1}(f)$ for the proportion of $3^{rd}$ order harmonic with respect to fundamental may be used as the basis for building another sweep signal, starting from step 712, which completes the iterative loop.

Upon fulfillment of one of the two conditions set in step 720, i.e., either that the ratio of the power densities of the fundamental component to the third harmonic component is greater than the target for the sweep signal which has been constructed or that the predetermined number of iterations n of the loop have been performed, then the final sweep signal s is obtained in step 728 by summing the harmonic and fundamental components:

$$s(t)=s_{F_n}(t)+s_{3_n}(t)$$

This final signal serves as a reference for the emission of the seismic signal and may be input into the vibrator control unit.

The signal can now be input into a vibrator so that a matching train of seismic waves is emitted, reflected onto various geological layers and recorded by the sensors set at the surface of the ground. The recorded signal may be correlated by the fundamental component of source reference $s_{F_n}(t)$ and then undergo further processing steps leading to a final image of the subsurface.

Figure 8:
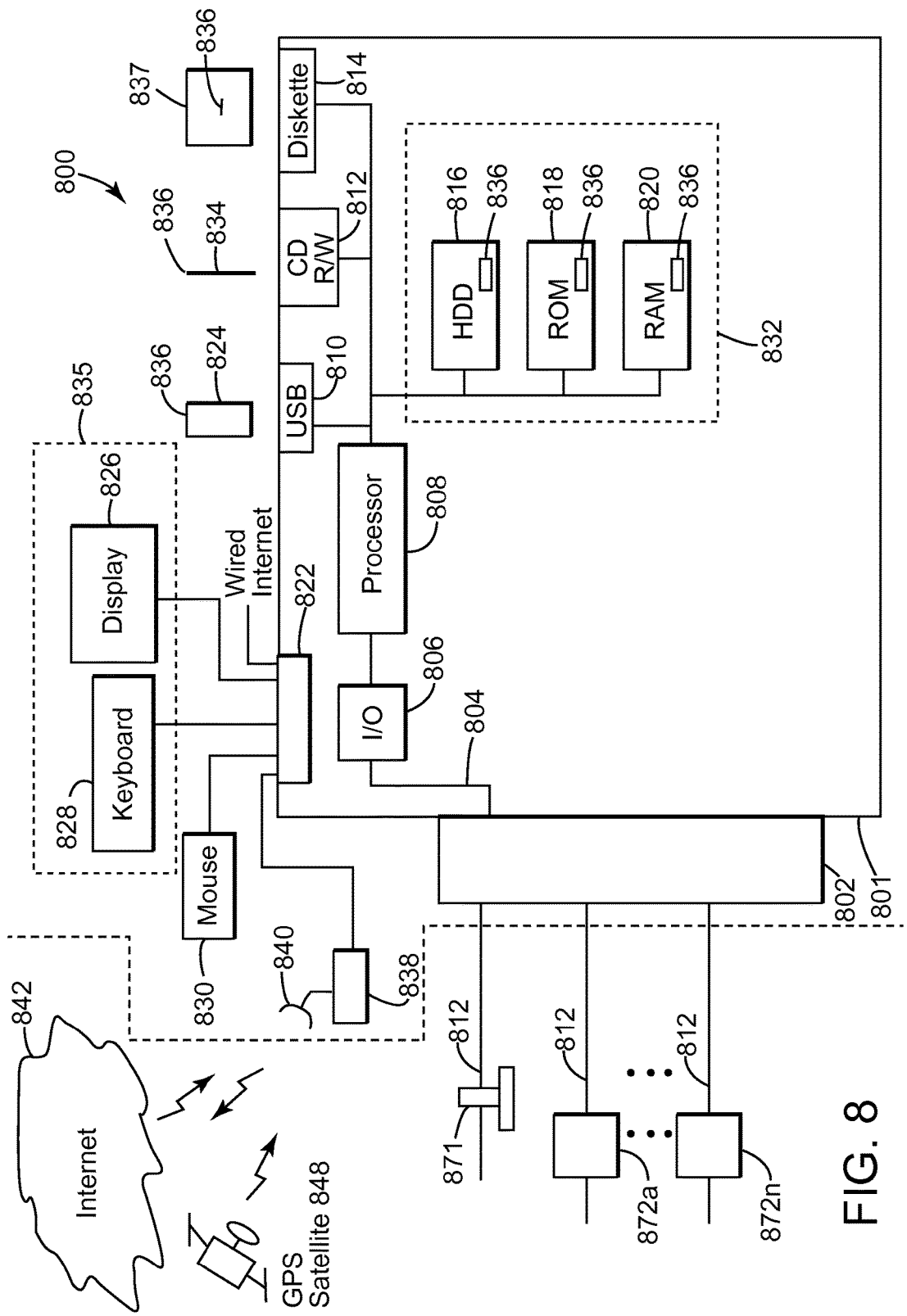
FIG. 8 illustrates a land seismic data acquisition system suitable for use to implement methods for generating frequency sweep signals according to an embodiment.

The methods described above for generating frequency sweep signals can also be used to implement land seismic systems. For example, FIG. 8 illustrates a land seismic data acquisition system 800 which uses frequency sweep signals with at least one odd order harmonic signal component(s). System 800 includes, among other items, server 801, source/receiver interface 802, internal data/communications bus 804, processor(s) 808 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 810, compact disk (CD)/digital video disk (DVD) read/write (R/W) drive 812, floppy diskette drive 814 (though less used currently, many servers still include this device), and data storage unit 832.

Data storage unit 832 itself can comprise hard disk drive (HDD) 816 (these can include conventional magnetic storage media, but, as is becoming increasingly more prevalent, can include flash drive-type mass storage devices 824, among other types), ROM device(s) 818 (these can include electrically erasable (EE) programmable ROM (EEPROM) devices, ultra-violet erasable PROM devices (UVPROMs), among other types), and random access memory (RAM) devices 820. Usable with USB port 810 is flash drive device 824, and usable with CD/DVD R/W device 812 are CD/DVD disks 834 (which can be both read and write-able). Usable with diskette drive device 814 are floppy diskettes 837. Each of the memory storage devices, or the memory storage media (816, 818, 820, 824, 834, and 837, among other types), can contain parts or components, or in its entirety, executable software programming code (software) 836 that can implement part or all of the portions of the method described herein. Further, processor 808 itself can contain one or different types of memory storage devices (most probably, but not in a limiting manner, RAM memory storage media 820) that can store all or some of the components of software 836.

In addition to the above described components, system 800 also comprises user console 835, which can include keyboard 828, display 1826, and mouse 830. All of these components are known to those of ordinary skill in the art, and this description includes all known and future variants of these types of devices. Display 826 can be any type of known display or presentation screen, such as liquid crystal displays (LCDs), light emitting diode displays (LEDs), plasma displays, cathode ray tubes (CRTs), among others. User console 835 can include one or more user interface mechanisms such as a mouse, keyboard, microphone, touch pad, touch screen, voice-recognition system, among other inter-active inter-communicative devices.

User console 835, and its components if separately provided, interface with server 801 via server input/output (I/O) interface 822, which can be an RS232, Ethernet, USB or other type of communications port, or can include all or some of these, and further includes any other type of communications means, presently known or further developed. System 800 can further include communications satellite/global positioning system (GPS) transceiver device 838 (to receive signals from GPS satellites 848), to which is electrically connected at least one antenna 840 (according to an embodiment, there would be at least one GPS receive-only antenna, and at least one separate satellite bi-directional communications antenna). System 800 can access the Internet 842, either through a hard wired connection, via I/O interface 822 directly, or wirelessly via antenna 840, and transceiver 838.

Server 801 can be coupled to other computing devices, such as those that operate or control the equipment of vehicles 122$a$, $b$ via one or more networks. Server 801 may be part of a larger network configuration as in a global area network (GAN) (e.g., Internet 842), which ultimately allows connection to various landlines.

According to a further embodiment, system 800, being designed for use in seismic exploration, will interface with one or more sources 871 and one or more receivers 872. These, as previously described, are attached to cables 812. As further previously discussed, sources 871 and receivers 872 can communicate with server 801 either through cable 812, or via a wireless system that can communicate via antenna 840 and transceiver 838 (collectively described as communications conduit 846).

According to further embodiments, user console 835 provides a means for personnel to enter commands and configuration into system 800 (e.g., via a keyboard, buttons, switches, touch screen and/or joy stick), e.g., to adjust or modify the sweep signal. Display device 826 can be used to show: visual representations of acquired data; source 871 and receiver 872 position and status information; survey information; and other information important to the seismic data acquisition process. Source and receiver interface unit 802 can also communicate bi-directionally with sources 871 and receivers 872 via communication conduit 846 to receive land seismic data and status information related to sources 871 and receivers 872, and to provide excitation signals and control signals to source 871 and receivers 872.

Bus 804 allows a data pathway for items such as: the transfer and storage of data that originate from either the source sensors or streamer receivers; for processor 808 to access stored data contained in data storage unit memory 832; for processor 808 to send information for visual display to display 826; or for the user to send commands to system operating programs/software 836 that might reside in either the processor 808 or the source and receiver interface unit 802.

System 800 can be used to implement method 600 and 700 for generating frequency sweep signals with a $3^{rd}$ order (and/or higher order) harmonic component of the fundamental signal for use with vibrators in a land seismic exploration system according to an embodiment. Hardware, firmware, software or a combination thereof may be used to perform the various steps and operations described herein. According to an embodiment, software 836 for carrying out the above discussed steps can be stored and distributed on multi-media storage devices such as devices 816, 818, 820, 824, 834, and/or 837 (described above) or other form of media capable of portably storing information (e.g., universal serial bus (USB) flash drive 824). These storage media may be inserted into, and read by, devices such as the CD-ROM drive 812, disk drives 814, 816, among other types of software storage devices.

As also will be appreciated by one skilled in the art, the various functional aspects of the embodiments may be embodied in a wireless communication device, a telecommunication network, as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

Figure 9A:
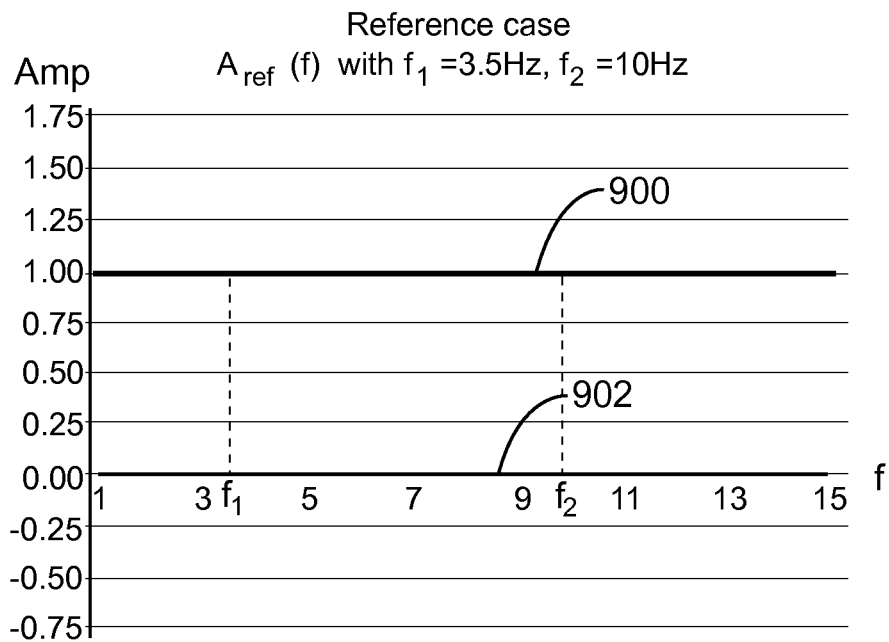
FIGS. 9A and 9B depict a reference frequency sweep and an optimized frequency sweep having frequency variable amplitude components of both a fundamental frequency and a third order harmonic according to an embodiment.
Figure 9B:
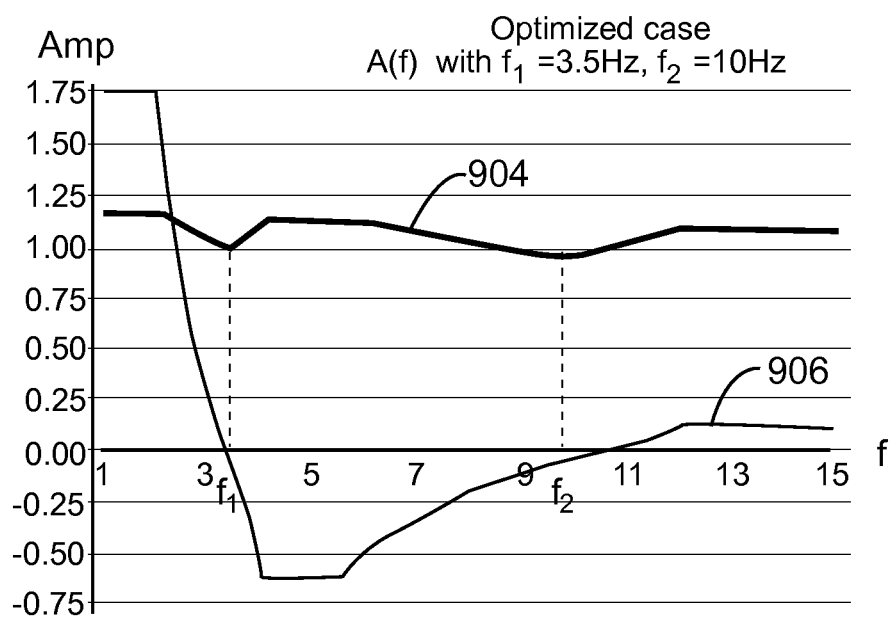

From the foregoing discussion of frequency sweep generation, it will be apparent that while conventional frequency sweeps typically used a constant amplitude, fundamental frequency sinusoidal function, according to these embodiments, sweep signals can have (1) both a fundamental frequency component and at least one odd order harmonic component and (2) the amplitudes of both of those components can vary as a function of frequency. To illustrate this, consider FIGS. 9A and 9B which illustrate the amplitudes of the both the fundamental frequency component and the third order component for a reference case, and an optimized case, respectively. FIG. 9A illustrates the reference case, wherein a fundamental frequency component 900 has a constant amplitude of (nominally) 1.00, while there is no third order harmonic component (so third order harmonic component 902 has an amplitude of zero). By way of contrast, FIG. 9B illustrates an optimized case wherein the amplitudes (amounts) of the fundamental frequency component 904 and third order component 906 are both generally non-zero (except at f1 and f2) and vary as a function of frequency.

Figure 10:
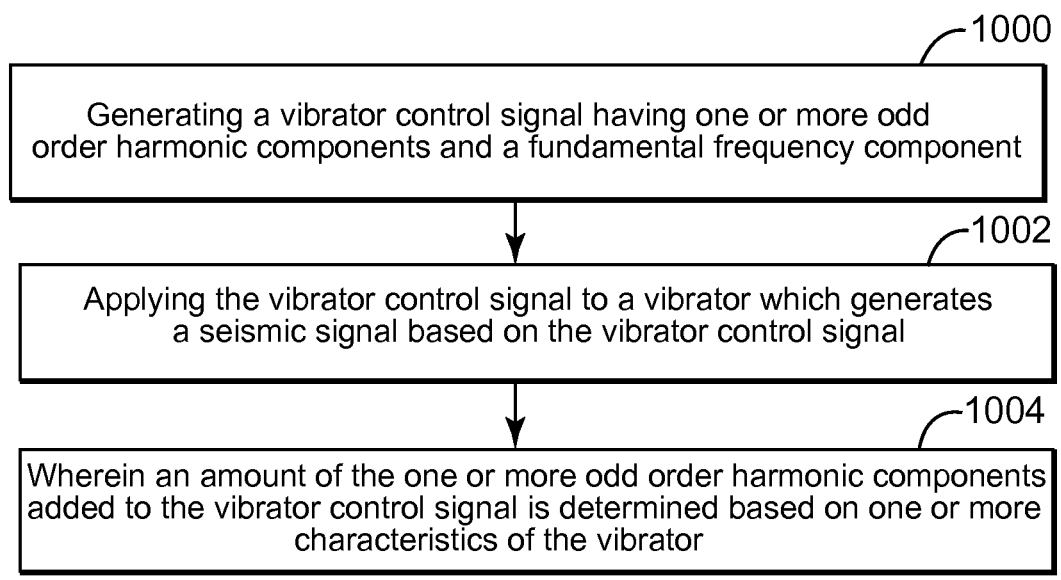
FIG. 10 is a flowchart illustrating a method according to another embodiment.

Additionally, while the flowchart of FIG. 7 describes a specific embodiment associated with generating a seismic signal by a vibrator which increases an amplitude of the fundamental component, other more general embodiments are contemplated herein. For example, with reference to the flowchart of FIG. 10, consider another embodiment. Therein, at step 1000, a vibrator control signal is generated having both one or more odd order harmonic components and a fundamental component. The vibrator control signal is applied to a vibrator which generates a seismic signal based on the vibrator control signal at step 1002. The seismic signal is then transmitted into the ground (for land embodiments) or water (for marine embodiments). The amount of the one or more odd order harmonic components added to the vibrator control signal is determined based on one or more characteristics of the vibrator used to generate the seismic signal, as indicated by step 1004. In this embodiment, it shall be appreciated that the control signal applied to the vibrator to generate a vibratory force is referred to as the "vibrator control signal", whereas the signal or acoustic wave that is generated by the vibrator in the ground or the water is referred to as the "seismic signal".

The disclosed embodiments provide a source array, computer software, and a method for generating frequency sweep signals. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of the embodiments are described in the embodiments in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

I claim:

1. A method for generating a seismic signal, comprising:
   generating a vibrator control signal having both a fundamental component and one or more odd order harmonic components defined as 2i+1, with i an integer equal to or larger than 1; and
   applying the vibrator control signal to a vibrator which generates a seismic signal based on the vibrator control signal, the seismic signal being transmitted into ground or water,
   wherein an amount of the one or more odd order harmonic components added to the vibrator control signal is determined based on one or more characteristics of the vibrator used to generate the seismic signal,
   wherein the one or more odd order harmonic components is selected from a group of odd order harmonics with i ranging from 1 to 10.

2. The method according to claim 1, wherein an amplitude of said seismic signal is increased by selecting the amount of said one or more odd harmonics and without increasing a required force, an oil flow rate and a mass displacement of the vibrator used to generate said seismic signal.

3. The method of claim 1, wherein an amplitude of the seismic signal is increased by the addition of the amount of the one or more odd order harmonics, the method further comprising:
   modifying a frequency versus time profile of the vibrator control signal based on the increased amplitude of the seismic signal.

4. The method of claim 1, wherein an amplitude of the one or more odd order harmonic components relative to an amplitude of the fundamental frequency component varies as a function of frequency.

5. The method according to claim 4, wherein the seismic signal is of the form—

$$s(t) = F(f(t)) \sin \varphi(t) + k_{max}(f(t)) F(f(t)) \sin(3\varphi(t))$$

wherein $F(f(t))$ is a frequency dependent amplitude of the fundamental frequency component of the generated seismic signal, and $k_{max}$ is a maximum value of a frequency dependent amplitude of the one or more odd order harmonic components of the generated seismic signal.

6. The method of claim 1, wherein the step of determining the amount of the one or more odd order harmonic components added to the vibrator control signal further comprises:
   selecting a minimum amplitude ratio between the fundamental component and the one or more harmonic components as a target;
   computing a proportion of the one or more odd order harmonic components that maximizes an amplitude of the fundamental component based, at least in part, on the one or more characteristics of the vibrator used to generate the seismic signal;
   building a sweep signal using the computed proportion;
   computing an estimate of a ratio of the at least one odd order harmonic components to the fundamental component in the sweep signal; and
   determining whether the computed estimate of the ratio in the sweep signal is greater than the target.

7. The method of claim 6, wherein if the computed estimate of the ratio in the sweep signal is greater than the target, then summing the one or more odd order harmonic components in the sweep signal with the fundamental component in the sweep signal to generate the seismic signal to be applied to the vibrator.

8. The method of claim 6, wherein if the computed estimate of the ratio in the sweep signal is less than the target, then adjust a weighting of the proportion of the one or more odd order harmonic components that maximizes the amplitude of the fundamental component, and re-iterate the steps of building the sweep signal, computing the estimate of the ratio and determining whether the computed estimate is greater than the target.

9. A system for generating a seismic signal, comprising:
a processor configured to generate a vibrator control signal having both a fundamental component and one or more odd order harmonic components defined as 2i+1, with i an integer equal to or larger than 1; and
a vibrator which uses the vibrator control signal to generate a seismic signal, the seismic signal being transmitted into ground or water,
wherein an amount of the one or more odd order harmonic components added to the vibrator control signal is determined based on one or more characteristics of the vibrator used to generate the seismic signal,
wherein the one or more odd order harmonic components is selected from a group of odd order harmonics with i ranging from 1 to 10.

10. The system according to claim 9, wherein an amplitude of said seismic signal is increased by selecting the amount of said one or more odd harmonics and without increasing a required force, an oil flow rate and a mass displacement of the vibrator used to generate said seismic signal.

11. The system of claim 9, wherein an amplitude of the seismic signal is increased by the addition of the amount of the one or more odd order harmonics, and further wherein a frequency versus time profile of the vibrator control signal is adapted based on the increased amplitude of the seismic signal.

12. The system of claim 9, wherein an amplitude of the one or more odd order harmonic components relative to an amplitude of the fundamental frequency component varies as a function of frequency.

13. The system according to claim 12, wherein the seismic signal is of the form—

$$s(t) = F(f(t))\sin\varphi(t) + k_{max}(f(t))F(f(t))\sin(3\varphi(t))$$

wherein $F(f(t))$ is a frequency dependent amplitude of the fundamental frequency component of the generated seismic signal, and $k_{max}$ is a maximum value of a frequency dependent amplitude of the one or more odd order harmonic components of the generated seismic signal.

14. The system of claim 9, wherein the processor determines the amount of the one or more odd order harmonic components added to the vibrator control signal by:
selecting a minimum amplitude ratio between the fundamental component and the one or more harmonic components as a target;
computing a proportion of the one or more odd order harmonic components that maximizes an amplitude of the fundamental component based, at least in part, on the one or more characteristics of the vibrator used to generate the seismic signal.
building a sweep signal using the computed proportion;
computing an estimate of a ratio of the at least one odd order harmonic components to the fundamental component in the sweep signal; and
determining whether the computed estimate of the ratio in the sweep signal is greater than the target.

15. The system of claim 14, wherein if the computed estimate of the ratio in the sweep signal is greater than the target, then the processor sums the one or more odd order harmonic components in the sweep signal with the fundamental component in the sweep signal to generate the seismic signal to be applied to the vibrator.

16. The system of claim 14, wherein if the computed estimate of the ratio in the sweep signal is less than the target, then the processor adjusts a weighting of the proportion of the one or more odd order harmonic components that maximizes the amplitude of the fundamental component, and re-iterates the steps of building the sweep signal, computing the estimate of the ratio and determining whether the computed estimate is greater than the target.

17. The system of claim 9, wherein the vibrator further comprises:
a base plate;
a reaction mass, and
an actuator that applies a force between base plate and reaction mass based on the seismic signal.

18. A non-transitory, computer readable medium which contains program instructions stored therein which, when executed by a specially-programmed computing system, performs the steps of:
generating a vibrator control signal having both a fundamental component and one or more odd order harmonic components defined as 2i+1, with i an integer equal to or larger than 1; and
applying the vibrator control signal to a vibrator which generates a seismic signal based on the vibrator control signal, the seismic signal being transmitted into ground or water,
wherein an amount of the one or more odd order harmonic components added to the vibrator control signal is determined based on one or more characteristics of the vibrator used to generate the seismic signal,
wherein the one or more odd order harmonic components is selected from a group of odd order harmonics with i ranging from 1 to 10.

* * * * *